(12) United States Patent
Sato et al.

(10) Patent No.: US 7,515,990 B2
(45) Date of Patent: Apr. 7, 2009

(54) ARTICLE CONTROL SYSTEM, ARTICLE CONTROL SERVER, ARTICLE CONTROL METHOD

(75) Inventors: Satoshi Sato, Osaka (JP); Shusaku Okamoto, Osaka (JP); Masamichi Nakagawa, Osaka (JP); Kunio Nobori, Osaka (JP); Osamu Yamada, Nara (JP); Tomonobu Naruoka, Kanagawa (JP); Yoshihiko Matsukawa, Nara (JP); Yasuhiro Morinaka, Kanagawa (JP); Katsuji Aoki, Nara (JP); Mikiya Nakata, Nara (JP)

(73) Assignee: Panasonic Corporation, Osaka (JP)

( * ) Notice: Subject to any disclaimer, the term of this patent is extended or adjusted under 35 U.S.C. 154(b) by 798 days.

(21) Appl. No.: 10/532,157

(22) PCT Filed: May 21, 2004

(86) PCT No.: PCT/JP2004/007342

§ 371 (c)(1),
(2), (4) Date: Apr. 20, 2005

(87) PCT Pub. No.: WO2004/103864

PCT Pub. Date: Feb. 12, 2004

(65) Prior Publication Data

US 2006/0047361 A1 Mar. 2, 2006

(30) Foreign Application Priority Data

May 21, 2003 (JP) .............................. 2003-143838

(51) Int. Cl.
*G06F 19/00* (2006.01)

(52) U.S. Cl. .................. 700/245; 700/247; 700/248; 700/250; 700/251; 700/252; 700/253; 700/254; 700/255; 700/257; 700/259; 700/260; 700/262; 700/264; 318/568.1; 318/568.11; 318/568.14; 318/568.16; 318/568.21; 318/568.23; 901/4; 901/43; 901/47

(58) Field of Classification Search ................. 700/245, 700/247, 248, 250, 251, 252, 253, 254, 255, 700/257, 259, 260, 262, 264; 318/568.1, 318/568.11, 568.14, 568.16, 568.21, 568.23; 901/4, 43, 47
See application file for complete search history.

(56) References Cited

U.S. PATENT DOCUMENTS 6,141,863 A * 11/2000 Hara et al. ..................... 29/714
(Continued)

FOREIGN PATENT DOCUMENTS

JP 61-151710 A 7/1986
(Continued)

OTHER PUBLICATIONS

Gräser, Technological Solutions to Autonomous Robot Control, 1998, Internet, p. 1-7.*
Martens et al., A Friend for Assisting Handicapped People, 2001, IEEE, p. 57-65.*

*Primary Examiner*—Khoi Tran
*Assistant Examiner*—Mcdieunel Marc
(74) *Attorney, Agent, or Firm*—Harness, Dickey & Pierce, P.L.C.

(57) ABSTRACT

The system includes a sensor for detecting a state of a space; a robot for executing a handling job for an article; an article identifying part for identifying, when an article is handled by a movable body, the article in response to a detection result obtained by the sensor; and an article handling subject identifying part for identifying an article handling subject that handles the article. When the movable body that handles the article is the robot, the article handling subject identifying part identifies a subject having issued a job instruction to the robot as the article handling subject.

18 Claims, 16 Drawing Sheets

U.S. PATENT DOCUMENTS

| | | | |
|---|---|---|---|
| 6,328,523 B1 * | 12/2001 | Watanabe et al. | 414/416.01 |
| 6,597,971 B2 * | 7/2003 | Kanno | 700/245 |
| 6,886,231 B2 * | 5/2005 | Lawson et al. | 29/407.01 |
| 7,123,992 B2 * | 10/2006 | Ban et al. | 700/258 |
| 7,313,464 B1 * | 12/2007 | Perreault et al. | 700/245 |

FOREIGN PATENT DOCUMENTS

| | | |
|---|---|---|
| JP | 07-230563 A | 8/1995 |
| JP | 09-278130 | 10/1997 |
| JP | 2000-357251 A | 12/2000 |
| JP | 2001-225915 A | 8/2001 |
| JP | 2002-021383 A | 1/2002 |
| JP | 2002-255313 A | 9/2002 |
| JP | 2003-132444 A | 5/2003 |
| JP | 2003-248900 A | 9/2003 |

* cited by examiner

REFERENCE IMAGE

CAMERA IMAGE

BACKGROUND DIFFERENTIAL IMAGE

ARTICLE HISTORY DATA (AT DOORWAY)

| POSITION: DOOR | | | | |
|---|---|---|---|---|
| TIME | ARTICLE | DETAILS OF HANDLING | HANDLING SUBJECT | EVENT |
| ⋮ | ⋮ | ⋮ | ⋮ | |
| t0 | Can_Small_0001 | BRING IN | FATHER | |
| t5 | Can_Small_0001 | TAKE OUT | FATHER (ROBOT) | |
| t6 | medicine_cabinet _0001 | BRING IN | MOTHER | |
| t8 | BAG A | BRING IN | MOTHER | |
| t9 | BAG C | TAKE OUT | FATHER | BUSINESS TRIP |
| t9 | CLOTHES A@BAG C | TAKE OUT | FATHER | BUSINESS TRIP |
| t9 | TOWEL C@BAG C | TAKE OUT | FATHER | BUSINESS TRIP |
| t9 | UMBRELLA B@BAG C | TAKE OUT | FATHER | BUSINESS TRIP |
| ⋮ | ⋮ | ⋮ | ⋮ | |

ACTUAL ENVIRONMENT

ENVIRONMENT MAP
(THREE-DIMENSIONAL MODELS)

ENVIRONMENT MAP
(TWO-DIMENSIONAL MODELS)

FIG.13

ARTICLE DATA

| ID | diary_0001 |
|---|---|
| POSITION HISTORY | LIST3 |
| ATTRIBUTE DATA | Book_0002 |
| HANDLING RIGHT | DAUGHTER |
| TIDY POSITION | (x2,y2,z2,l2,m2,n2) |
| TIDY STATE | Door_key_0004 Lock |

FIG.14

ARTICLE DATA

| ID | shirt_0001 |
|---|---|
| POSITION HISTORY | LIST4 |
| ATTRIBUTE DATA | clothes_0102 |

| ARTICLE STATE (PLACE) | SON'S ROOM | DRESSING ROOM |
|---|---|---|
| HANDLING RIGHT | SON | ALL |
| TIDY POSITION | IN DRAWERS | LAUNDRY BASKET |
| TIDY STATE | FOLDED | - |

FIG.16

ARTICLE DATA

| ID | shirt_0001 |
|---|---|
| POSITION HISTORY | LIST4 |
| ATTRIBUTE DATA | clothes_0102 |

| PLACE OF ARTICLE | SON'S ROOM | DRESSING ROOM | DRESSING ROOM |
|---|---|---|---|
| VICINITY STATE OF ARTICLE | - | NO PERSON | SOME PERSON |
| HANDLING RIGHT | SON | ALL | PERSON IN VICINITY |
| TIDY POSITION | IN DRAWERS | LAUNDRY BASKET | LAUNDRY BASKET |
| TIDY STATE | FOLDED | - | - |

FIG.17

ARTICLE HISTORY DATA

POSITION HISTORY LIST4

| TIME | DETAILS OF HANDLING | HANDLING SUBJECT | POSITION AFTER HANDLING |
|------|---------------------|------------------|-------------------------|
| t1   | WASH                | MOTHER           | (x4 ,y4 ,z4 ,l4,m4,n4)  |
| t2   | MOVE                | MOTHER           | (x3 ,y3 ,z3,l3,m3,n3)   |
| t3   | TAKE OUT            | SON              | (x6 ,y6 ,z6,l6,m6,n6)   |
| t4   | BRING IN            | SON              | (x6 ,y6 ,z6,l6,m6,n6)   |
| t5   | MOVE                | SON              | (x5 ,y5 ,z5,l5,m5,n5)   |

FIG.18

ARTICLE HISTORY DATA

POSITION HISTORY LIST4

| TIME | DETAILS OF HANDLING | HANDLING SUBJECT | POSITION AFTER HANDLING |
|------|---------------------|------------------|-------------------------|
| t11  | WASH                | MOTHER           | (x4 ,y4 ,z4 ,l4,m4,n4)  |
| t12  | MOVE                | MOTHER           | (x3 ,y3 ,z3,l3,m3,n3)   |
| t13  | MOVE                | SON              | (x5 ,y5 ,z5,l5,m5,n5)   |

ARTICLE CONTROL SYSTEM, ARTICLE CONTROL SERVER, ARTICLE CONTROL METHOD

TECHNICAL FIELD

The present invention relates to an article management system, an article management server and an article management method employed for managing articles in a given space.

BACKGROUND ART

An article management system for managing, in an office or a house, articles by using electronic tags is conventionally known (for example, see Japanese Laid-Open Patent Publication No. 2000-357251).

The article management system described in the aforementioned publication merely manages the present positions of respective articles in an office or in a room (space) of an ordinary house but does not manage by whom the respective articles have been handled.

In a life space (including not only an office and a house but also a hotel, a shop, a hospital and the like) where people actively move, however, a variety of people handle a variety of articles. Therefore, it seems that various convenience is attained by managing handling of articles by people.

As an example of the management of handling of articles, a specific person is restrained from handling a specific article. For example, in an ordinary house, it is preferred that a child is restrained from handling a medicine cabinet. Therefore, articles forbidden to be handled by children are generally put in a space where children cannot reach. But such a countermeasure is not always effective.

Also, a robot for supporting activities of a person while coexisting with the person in a life space is recently being earnestly studied and developed. Accordingly, a robot system in which a robot capable of grabbing articles is introduced into a family or the like so that the robot may move articles on behalf of a person challenged in carrying articles, such as an aged person, will be realized in the future.

When a robot is introduced into a family, however, there arises another problem. Even when a medicine cabinet is safely kept so as not to be handled by children, a child can handle the medicine cabinet by operating the robot.

DISCLOSURE OF THE INVENTION

The present invention was devised in consideration of the aforementioned circumstances, and an object of the invention is managing handling of articles by movable bodies in a given space, thereby improving convenience.

The article management system of the invention is a system for managing articles in a given space.

The article management system includes a robot for executing a handling job for an article; robot controlling means for making the robot execute the handling job in accordance with a job instruction; sensing means for detecting a state within the space; article identifying means for identifying, when an article is handled by a movable body, the handled article in response to a detection result obtained by the sensing means; and article handling subject identifying means for identifying, when an article is handled by a movable body, an article handling subject that handles the article in response to the detection result obtained by the sensing means.

When the movable body that handles the article is the robot, the article handling subject identifying means identifies a subject having issued the job instruction as the article handling subject that handles the article.

The state of the space is detected by the sensing means, and when an article is handled by a movable body in the space, the article identifying means identifies the article and the article handling subject identifying means identifies the article handling subject. Thus, handling of an article is managed in the space.

When the article is handled by the robot, the subject having issued the job instruction to the robot is identified as the article handling subject that handles the article. Thus, a substantial article handling subject can be identified in the case where an article is handled by using the robot.

The other article management system of this invention includes a robot for executing a handling job for an article; robot controlling means for making the robot execute the handling job in accordance with a job instruction; a database for storing information of handling rights set with respect to the articles; and handling right determining means for determining, on the basis of the information stored in the database, whether or not a subject having issued the job instruction has the handling right of the article related to the handling job.

The robot controlling means determines details of the handling job of the robot in response to a determination result obtained by the handling right determining means.

The article management server of this invention is a server for managing articles in a given space.

This server includes robot controlling means for making a robot execute a handling job in accordance with a job instruction; article identifying means for identifying, when an article is handled by a movable body, the handled article in response to a detected state of the space; and article handling subject identifying means for identifying, when an article is handled by a movable body, an article handling subject that handles the article in response to the detected state, and when the movable body that handles the article is the robot, the article handling subject identifying means identifies a subject having issued the job instruction as the article handling subject that handles the article.

The article management method of this invention is a method for managing articles in a given space.

This method includes a detecting step of detecting a state of the space; an article identifying step of identifying, when an article is handled by a movable body, the handled article in response to a detection result obtained in the detecting step; and an article handling subject identifying step of identifying, when an article is handled by a movable body, an article handling subject that handles the article in response to the detection result obtained in the detecting step, and when the movable body that handles the article is the robot, a subject having issued a job instruction to the robot is identified as the article handling subject that handles the article in the article handling subject identifying step.

BRIEF DESCRIPTION OF DRAWINGS

FIG. 6 is a diagram for showing a structure of an article history data obtained at a door and exemplified contents thereof.

FIG. 13 is a diagram for showing exemplified contents of article data.

FIG. 14 is a diagram for showing exemplified contents of the article data.

FIG. 16 is a diagram for showing exemplified contents of the article data.

FIG. 17 is a diagram for showing exemplified contents of article history data.

FIG. 18 is a diagram for showing exemplified contents of the article history data.

BEST MODE FOR CARRYING OUT THE INVENTION

Now, a preferred embodiment of the invention will be described with reference to the accompanying drawings. The article management system of this invention is a system for managing articles in a given space. Herein, a given space means a space (life space) where people actively moves, such as an ordinary house, an office, a hotel, a shop or a hospital. In this embodiment, an ordinary house is described as an example and a space within the house corresponds to the given space. Also, the "space" is herein sometimes designated as an "environment", and the "space" or the "environment" is a generic term including a physical space itself and its surrounding environment affecting the physical space. A "space state" means not only the state of the space itself but also the states of articles and movable bodies present in the space.

Figure 1:
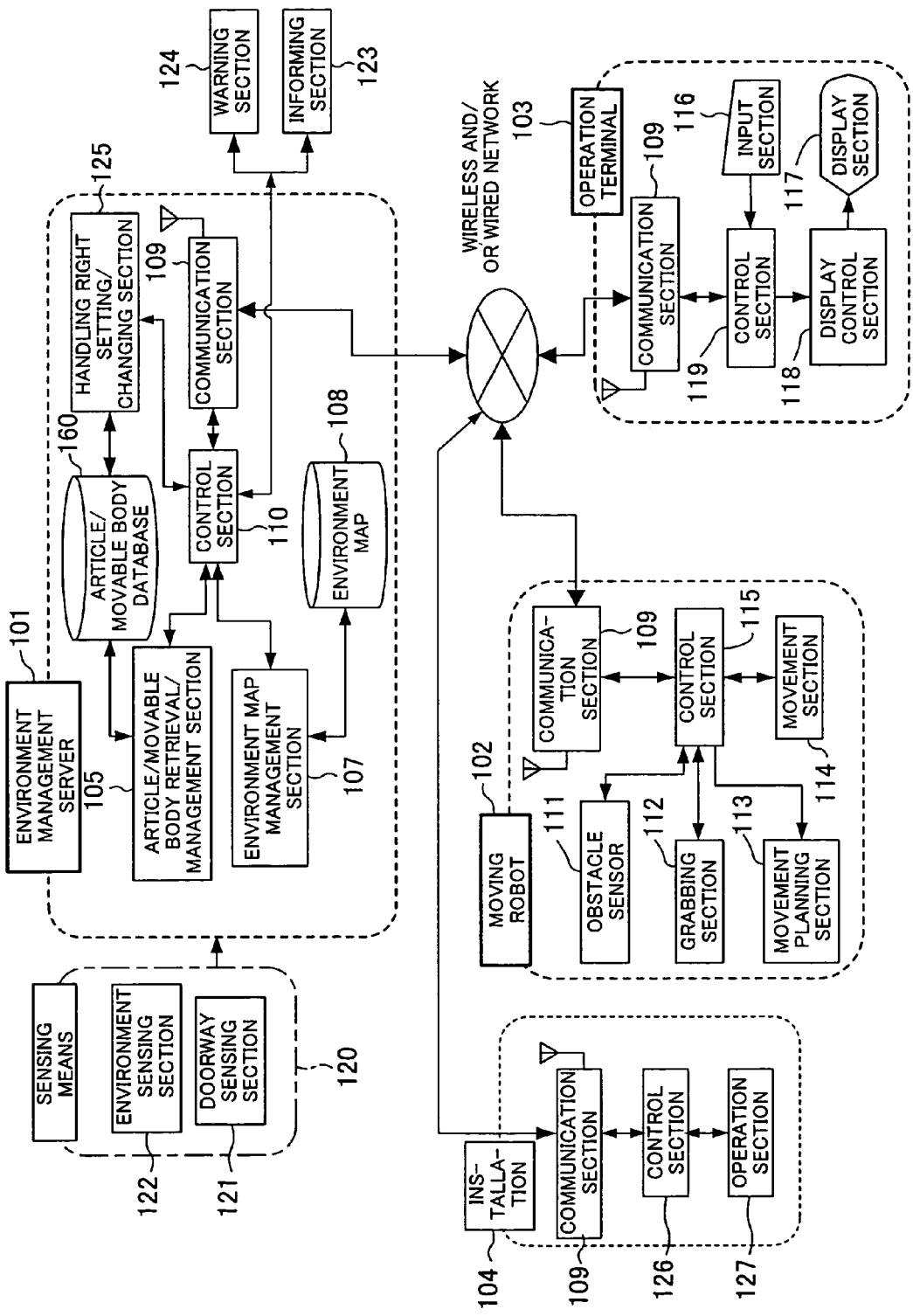
FIG. 1 is a block diagram for showing the whole architecture of an article management system according to an embodiment of the invention.

The present system includes, as shown in FIG. 1, roughly divided four sub-systems, that is, an environment management server 101 (hereinafter sometimes referred to simply as the server), a moving robot 102 (hereinafter sometimes referred to simply as the robot), an operation terminal 103 and an installation 104. These four sub-systems 101 through 104 are mutually connected through a wireless and/or wired network so as to send/receive information via the network.

Each of the four sub-systems 101 through 104 includes a control section 110, 115, 119 or 126 and a communication section 109. The communication sections 109 of all the sub-systems 101 through 104 perform the same processing and hence are referred to with the same reference numeral.

Herein, an article means a thing handled by a person or the moving robot 102. Also, a person and the moving robot 102, which handle articles, are hereinafter generically designated as movable bodies. Furthermore, a movable body that is handling an article is designated as an article handling subject.

-Architecture of Sensing Means-

The present system includes sensing means 120 for detecting/grasping the space state (environment). The sensing means 120 is connected to the first sub-system, that is, the environment management server 101.

The sensing means 120 includes a doorway sensing section 121 for detecting the state of a doorway to the space and an environment sensing section 122 for detecting the state within the space.

(Doorway Sensing Section)

The doorway sensing section 121 detects that a movable body has brought an article into the environment and that a movable body has taken an article out of the environment. In other words, the doorway sensing section 121 detects that an article is made to pass through the doorway by an article handling subject.

The doorway sensing section 121 can employ an architecture including an electronic tag and a reader/writer.

An electronic tag is a device composed of an IC for storing data and an antenna for wirelessly sending/receiving data, and a reader/writer is an apparatus capable of reading information written in an electronic tag and writing information in an electronic tag.

Figure 2:
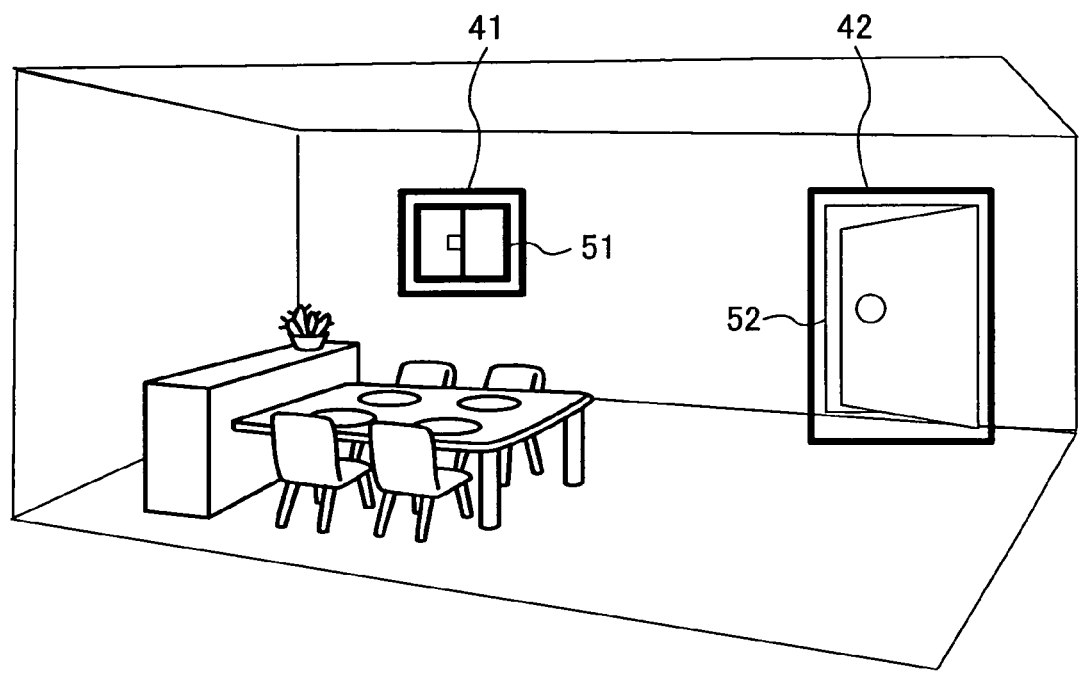
FIG. 2 is a diagram for showing an example in which gate-type readers/writers are provided on a door and a window.

For example, as shown in FIG. 2, gate-type readers/writers (RF antennas) 41 and 42 are respectively installed on the openings of a window 51 and a door 52 corresponding to the doorways between the environment and the outside.

Electronic tags are previously provided on all articles passing through the doorways. Each electronic tag preferably stores data of the corresponding article, such as the kind, the shape and the weight of the article, an image of the article and the fabrication date.

Furthermore, electronic tags are previously provided on movable bodies passing through the doorways. An electronic tag to be provided on a person may be buried in something he/she always carries (such as a wristwatch or a ring). An electronic tag to be provided on a movable body preferably stores data of the corresponding movable body, such as the name and the birthday of the person.

When an article and a movable body pass through the window 51 or the door 52, the reader/writer 41 or 42 installed on the doorway reads information sent from the electronic tags provided on the article and the movable body. The doorway sensing section 121 can detect the passage of the article and the movable body through the doorway by reading the information from the electronic tags.

When the reader/writer is doubly installed on each doorway, the doorway sensing section 121 can detect not only the passage of an article through the doorway but also whether the article has been brought in or taken out of the environment distinguishably.

In other words, although not shown in the drawings, a first reader/writer is installed outside the opening of the window 51 or the door 52 and a second reader/writer is installed inside the opening of the window 51 or the door 52. In this manner, the following determination can be made: If the first reader/writer installed outside the opening, namely, outside the environment, detects information from an electronic tag before the second reader/writer installed inside the opening, namely, inside the environment, detects the information from the electronic tag, it is determined that an article has been brought into the environment from the outside or that a movable body has entered the environment. On the contrary, if the second reader/writer installed inside the opening detects information from an electronic tag before the first reader/writer installed outside the opening detects the information from the electronic tag, it is determined that an article has been taken out of the environment or a movable body has gone out of the environment.

In FIG. 2, the reader/writer 41 or 42 is installed so as to surround the whole periphery of the window 51 or the door 52, so that highly accurate detection can be performed no matter which direction an electronic tag faces. The reader/writer 41 or 42 may be installed merely in upper/lower positions, in right/left positions or at the center of the window 51 or the door 52.

The architecture of the doorway sensing section 121 is not limited to that including an electronic tag and a reader/writer but another architecture may be employed. Also in this case, it is preferred that an article having been brought in and an article having been taken out can be distinguished from each other in the detection. However, the environment sensing section 122 described below can detect articles present in the environment. Therefore, even when the doorway sensing section 121 cannot distinguish bringing in of an article from taking out of an article, whether an article has been brought in or taken out of the environment is distinguishable by combining the detection result obtained by the environment sensing section 122 and the detection result obtained by the doorway sensing section 121.

(Environment Sensing Section)

The environment sensing section 122 continuously detects the positions and the states of articles, equipment (including furniture and the like), persons and the robot 102 present in the environment.

The environment sensing section 122 can employ an architecture using an image sensor. When the environment sensing section 122 uses the image sensor, cameras are fixed on the ceiling, the wall and the like of a room, so that the articles and the like present in the room can be detected on the basis of camera images captured by the cameras.

One of general methods for detecting articles and movable bodies present in the environment by using camera images is a background differential method. The environment sensing section 122 can utilize the background differential method. In the background differential method, a reference image corresponding to the background is previously prepared, and an object is detected by obtaining a difference between a current camera image and the reference image.

The environment sensing section 122 of the present system is used for detecting/monitoring articles and movable bodies present in the environment. Therefore, when the change of the environment state is small, an image captured when none of articles and movable bodies is present in the environment may be used as the reference image. In the case where the change of the environment state is large, an image obtained by averaging a plurality of images captured at given time intervals may be used as the reference image.

Figure 3A:
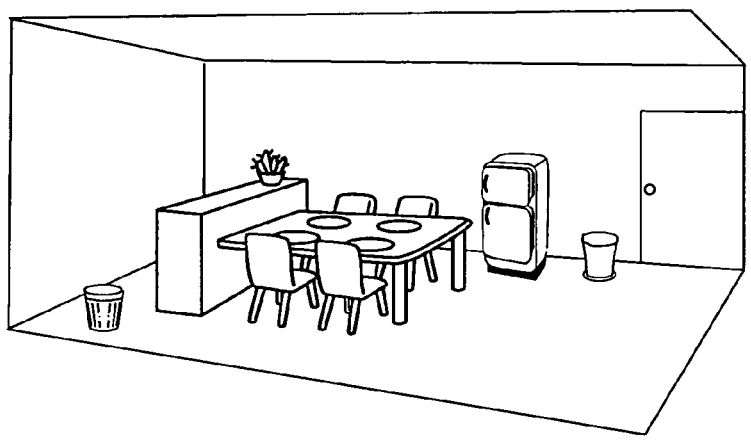
FIG. 3A is a diagram of an example of a reference image.
Figure 3B:
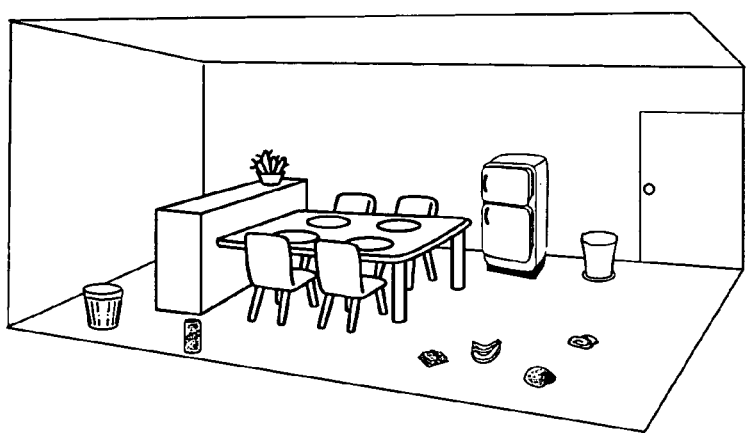
FIG. 3B is a diagram of an example of a camera image.
Figure 3C:
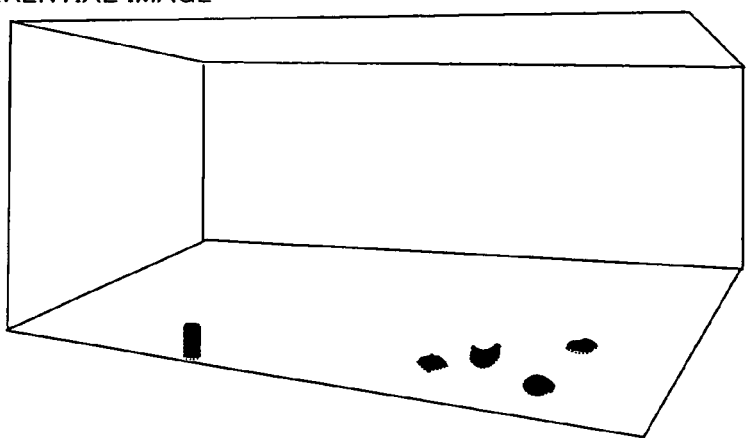
FIG. 3C is a diagram of an example of a background differential image.

Specifically, a method for detecting an article by employing the background differential method will be described with reference to FIG. 3. At this point, FIG. 3A is a diagram of an example of the reference image, FIG. 3B is a diagram of an image (input image) captured by a camera at a given point of time, and FIG. 3C is a diagram of an example of a background differential image obtained by subtracting the reference image from the input image. As is understood from FIG. 3C, portions corresponding to a difference between the input image and the reference image are conspicuous in the background differential image (as shown as hatched portions in the drawing). Therefore, when these conspicuous portions are taken out, articles present in the environment can be detected. Also, the articles can be identified by processing the image (which processing is performed in this embodiment by an article identifying part 32 described below).

Furthermore, the environment sensing section 122 can employ an architecture composed of electronic tags and a reader/writer similarly to the doorway sensing section 121.

When the environment sensing section 122 includes electronic tags and a reader/writer, a large number of readers/writers are provided in the environment although not shown in the drawings. Also, each of articles and movable bodies present in the environment is provided with an electronic tag. In this manner, the readers/writers provided in the environment can read information sent from the electronic tags provided on the articles present in the environment, so that the articles and the movable bodies present in the environment can be detected on the basis of the read information without using a camera.

When the environment sensing section 122 uses the cameras, it merely detects the presence of the articles. However, when the environment sensing section 122 uses the electronic tags and the readers/writers, it not only detects the presence of the articles but also utilizes information stored in the electronic tags. Thus, the convenience is further improved. For example, an article can be definitely identified, the use-by date of an article can be managed on the basis of the fabrication date, and a job of the robot 102 for grabbing an article, which will be described later, can be performed with ease on the basis of the shape data of the article.

In the case where the articles and the like are detected by using the cameras, there generally are a large number of problems, and for example, the system is harmfully affected by the change of brightness, the resolution is low, an article cannot be detected when it is occluded by another article, and a plurality of articles may be detected as one article when they are piled up.

For example, in order to solve the problem of a dead angle, a plurality of cameras are provided substantially uniformly in the environment, so that all articles present in the environment can be captured by any of the cameras. However, even when a large number of cameras are provided for eliminating a dead angle, the problem of the resolution and the problem of piled articles cannot be solved. Therefore, it is sometimes difficult to identify a conspicuous portion of the background differential image. In other words, when the environment sensing section 122 employs the architecture using the cameras, it is disadvantageously difficult to identify a detected article.

On the other hand, it is necessary to use a very weak radio wave harmless to a human body for sending data between an electronic tag and a reader/writer, and a communication distance between an electronic tag and a reader/writer is as short as several tens cm. Therefore, in order to detect all articles present in the environment without fail, a large number of readers/writers should be provided in the environment. However, a reader/writer is more expensive than a camera and hence it is not realistic to provide a large number of them in the environment. Thus, when the environment sensing section 122 employs the architecture using the electronic tags and the readers/writers, although a detected article can be easily identified, the cost is disadvantageously increased.

In this manner, the architecture using the cameras and the architecture using the electronic tags and the readers/writers respectively have disadvantages. Therefore, when the environment sensing section 122 employs an architecture using both an image sensor and electronic tags, the disadvantages of the architectures respectively using merely one of them can be both overcome. Specifically, hybrid processing for detecting the position of an article present in the environment by the background differential method and identifying the article by using an electronic tag is performed. Specific processing will be described by using the following two examples:

In one example, the environment sensing section 122 employs an architecture in which cameras are provided on the ceiling, the wall and the like of the environment and a reader/writer is provided on the moving robot 102. Also, each of articles and movable bodies is provided with an electronic tag. In this processing, the position of an article present in the environment is first detected by the background differential method using a camera image. Next, the robot 102 is moved to be close to the detected article, so that information can be read from the electronic tag provided on the article by using the reader/writer provided on the robot 102. In this manner, the article can be definitely identified.

In another example, the environment sensing section 122 employs an architecture in which cameras are provided on the ceiling, the wall and the like of the environment and a plurality of readers/writers are provided substantially uniformly in the environment. Each reader/writer has directivity in reading data of an electronic tag and its data reading direction is variable. In this processing, the position of an article present in the environment is first detected by the background differential method using a camera image. Next, a reader/writer provided closest to the detected article is selected, and the reading direction of the reader/writer is turned toward the article. Thus, information is read from the electronic tag provided on the article. In this manner, the article can be definitely identified. In this example, a distance between the reader/writer and the electronic tag may be large in some cases, and therefore, a comparatively strong radio wave is used. Accordingly, it is preferred that the reader/writer reads the information of the electronic tag after confirming that no person is in the environment by, for example, the background differential method.

Apart from the architectures herein described, the environment sensing section 122 may employ another architecture, such as one using a sensing method with light beacon.

When the sensing means 120 detects the state within the environment, particularly, when it detects an article brought in/taken out of the environment and an article moved (handled) within the environment, it transmits the detection result to the server 101.

-Architecture of Environment Management Server-

The environment management server 101 includes, as shown in FIG. 1, an article/movable body retrieval/management section 105 for managing the states of articles and movable bodies present in the environment out of the states grasped by the sensing means 120; an article/movable body database 160 for storing data of the articles and the movable bodies; an environment map management section 107 for managing the state of the whole environment excluding the articles and the movable bodies; an environment map 108 for storing data of the whole environment; the communication section 109 that receives, from the outside, an inquiry (signal) for data of the article/movable body database 160 and data of the environment map 108, sends a response signal to the inquiry to the outside and sends a control command for the robot 102; a handling right setting/changing section 125 for setting/changing the handling right of each article; and the control section 110 for controlling these sections 105, 107, 109 and 125.

At this point, a handling right means a right to permit a movable body to handle a specific article and is set with respect to each article. In the present system, the handling right is used for restraining a movable body not having the handling right of an article from handling the article and for changing details of a job of the robot.

The environment management server 101 can be constructed from a general computer. In this case, a control program for executing processing described below is read by the computer, so that the computer can function as the environment management server 101.

(Article/Movable Body Retrieval/Management Section)

The article/movable body retrieval/management section 105 stores, in the article/movable body database (DB) 160, information of articles and movable bodies detected by the sensing means 120.

Also, the article/movable body retrieval/management section 105 identifies an article on the basis of information supplied from the sensing means 120, identifies a movable body that handles the article, and stores the identification results in the article/movable body DB 160.

Furthermore, when an article is handled by a movable body, the article/movable body retrieval/management section 105 determines whether or not the movable body (article handling subject) has the handling right of the article.

In addition, when the control section 110 makes an inquiry to the article/movable body DB 160, the article/movable body retrieval/management section 105 takes out necessary information from the article/movable body DB 160 in accordance with the content of the inquiry and sends the information to the control section 110.

Figure 4:
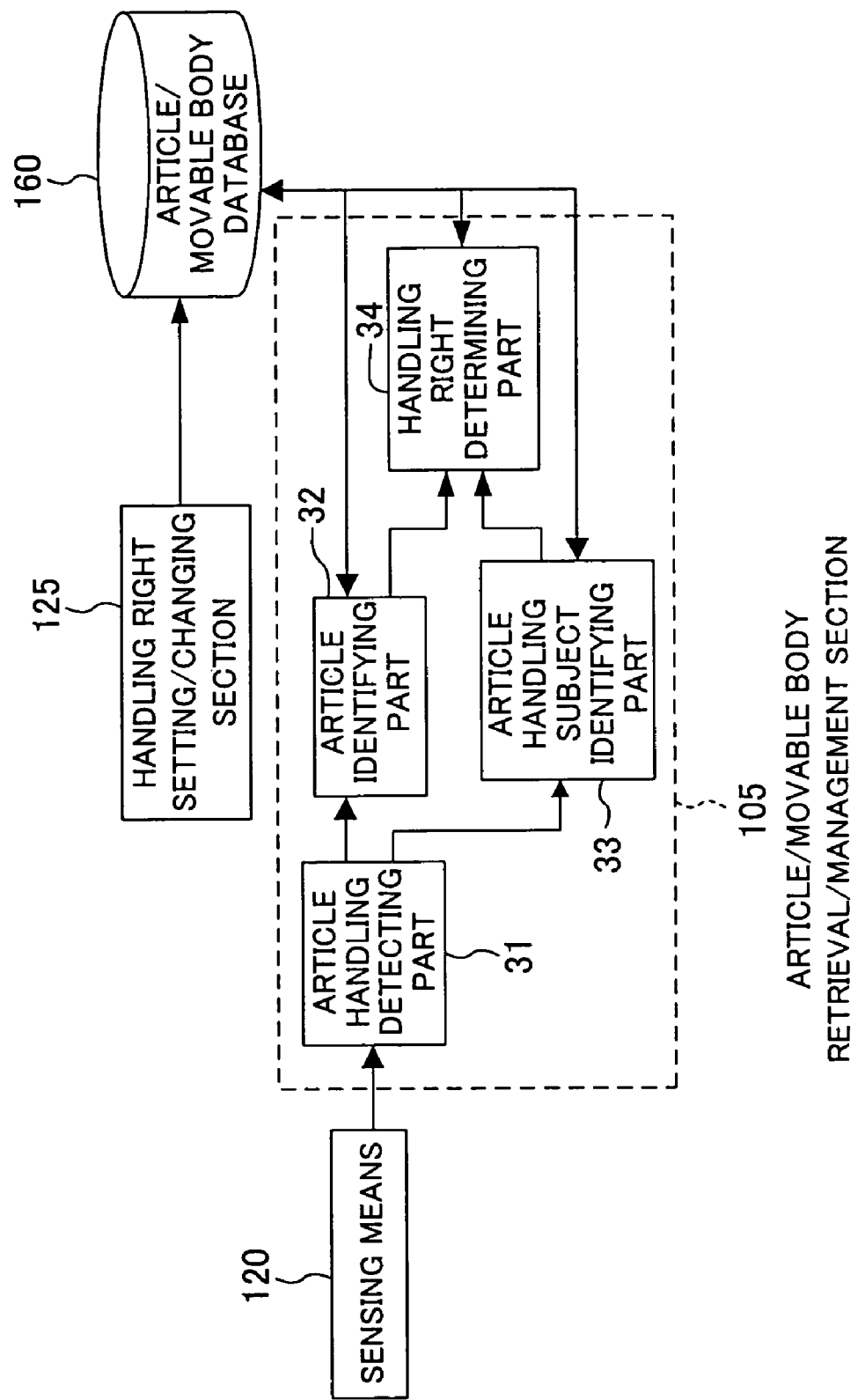
FIG. 4 is a block diagram for showing the architecture of an article/movable body retrieval/management section.

The article/movable body retrieval/management section 105 includes, as shown in FIG. 4, an article handling detecting part 31 for detecting the state of an article handled by a movable body (the article handling state) in response to the detection result supplied from the sensing means 120; the article identifying part 32 for identifying the article handled by the movable body in response to the detection result obtained by the article handling detecting part 31; an article handling subject identifying part 33 for identifying the movable body that handles the article (article handling subject) in response to the detection result obtained by the article handling detecting part 31; and a handling right determining part 34 for determining whether or not the handling right of the article is set to the article handling subject in response to the identification result obtained by the article identifying part 32 and the identification result obtained by the article handling subject identifying part 33.

The article handling detecting part 31 detects an article handling state at the doorway of the environment on the basis of the detection result obtained by the doorway sensing section 121. Specifically, when the doorway sensing section 121 detects the passage of both an article and a movable body through the doorway, the article handling detecting part 31 detects that the article is handled by the movable body at the doorway.

Also, the article handling detecting part 31 detects an article handling state within the environment on the basis of the detection result obtained by the environment sensing section 122. Specifically, in the case where the environment sensing section 122 performs the detection of an article within the environment by utilizing the background differential method, when there arises a difference between an input image (camera image) and the reference image, the article handling detecting part 31 detects that an article is handled in the position of the difference.

Alternatively, in the case where the environment sensing section 122 performs the detection of an article within the environment by utilizing the electronic tags and the readers/writers, when a reader/writer that has been reading information from an electronic tag becomes unable to read the information from the electronic tag or, on the contrary, when a reader/writer that has not been reading information from an electronic tag becomes able to read information from an electronic tag, the article handling detecting part 31 detects that an article provided with the electronic tag is being handled.

When the article handling detecting part 31 detects an article handling state, the article identifying part 32 identifies the article handled by the article handling subject and stores the information of the article in the article/movable body DB 160.

When the sensing means 120 uses the electronic tags and the readers/writers as described above, the article identifying part 32 identifies the article on the basis of the information from the electronic tag. Alternatively, when the sensing means 120 uses a camera image, it identifies the article through article identification processing performed on the basis of the camera image.

When the article handling detecting part 31 detects an article handling state, the article handling subject identifying part 33 identifies the article handling subject that handles the article and stores the information of the article handling subject in the article/movable body DB 160.

When the article handling detecting part 31 detects that an article is handled at the doorway (namely, an article is brought in or taken out), the article handling subject identifying part 33 identifies a movable body passing through the doorway simultaneously with the article as the article handling subject. The article handling subject is identified on the basis of information obtained from the electronic tag provided on the movable body.

On the other hand, when the article handling detecting part 31 detects that an article is handled within the environment, the article handling subject identifying part 33 identifies the article handling subject as follows: In the case where the environment sensing section 122 detects an article by using a camera, the article handling subject identifying part 33 makes the camera capture an image of the place where the article is handled, performs face recognition processing on the captured image and identifies the movable body through the recognition processing. It is presumed that the thus identified movable body is in the vicinity of the handled article and hence can be assumed as the article handling subject. At this point, since the camera used as the environment sensing section 122 is used for the article detection by the background differential method, it is generally a wide angle camera covering a wide range. The resolution of an image captured by the wide angle camera is comparatively low, and sometimes too low to perform the face recognition processing. Therefore, apart from the camera used for the background differential method, a narrow angle camera with high resolution may be provided as a camera for the face recognition processing within the environment or on the robot 102. In this case, the article handling subject identifying part 33 makes the narrow angle camera capture an image of the place where the article handling state is detected by the article handling detecting part 31 and performs the face recognition processing on the captured image. Thus, the article handling subject identifying part 33 can accurately identify the article handling subject.

The method for identifying the article handling subject employed by the article handling subject identifying part 33 is not limited to the face recognition processing but may be, for example, iris recognition or another recognition processing. Alternatively, without performing the recognition processing on the camera image, the camera image itself may be stored in the article/movable body DB 160 for keeping the information of the article handling subject. Alternatively, the image may be thus stored merely when the movable body cannot be identified through the recognition processing.

Alternatively, the article handling subject may be identified by using an electronic tag or by using light beacon.

The identification of the article handling subject at the doorway may be performed through the face recognition using a camera image.

In the present system, an article is handled not only by a human but also by the robot 102 operated in accordance with details of a job specified by a human in the operation terminal 103 as described later. When an article is handled by the robot 102 in this manner, the robot 102 may be identified as the article handling subject or a subject having issued a job instruction to the robot 102 may be identified as the article handling subject. In this embodiment, the subject having issued the job instruction to the robot 102 is identified as the article handling subject. The "subject" issuing a job instruction includes a human and the server 101. The server 101 issues a job instruction when the robot 102 is automatically made to execute a job without a job instruction from a human, which will be described later.

The handling right determining part 34 determines, on the basis of the information stored in the article/movable body database 160, whether or not the article handling subject identified by the article handling subject identifying part 33 is permitted to handle the article identified by the article identifying part 32, which will be described in detail later.

(Handling Right Setting/Changing Section)

The handling right setting/changing section 125 sets the handling right of each article and stores information of the handling right in the article/movable body database 160 described below.

The handling right setting/changing section 125 sets the handling right of an article to a movable body or a movable body group consisting of a plurality of movable bodies. The handling right can be set with respect to each movable body by setting the handling right of an article to each movable body. For example, the handling right of a medicine cabinet is set to "Mother". When there are a plurality of movable bodies to which the handling right is to be set, the handling right can be simultaneously set to all of the movable bodies by setting the handling right of an article to each movable body group. For example, the handling right of a medicine cabinet is set to "parents". In this case, "parents" corresponding to a movable body group consisting of Mother and Father, and therefore, it is equivalent to the handling right of the medicine cabinet set respectively to Mother and Father.

A movable body group may be formed by, for example, a user specifying respective movable bodies belonging to the group.

Alternatively, a movable body group may be formed by giving conditions about attributes of movable bodies, such as an age and sexuality. For example, when a condition of an age over twenty years is given, a movable body group consisting of movable bodies according with the condition, namely, a movable body group consisting of movable bodies of an age over twenty years old, can be formed.

Furthermore, a movable body group can be formed by using an AND or an OR of movable body groups set in the aforementioned manner and/or conditions about the attributes of movable bodies. For example, a movable body group B can be formed as a "movable body group consisting of movable bodies belonging to a movable body group A and movable bodies of an age over twenty years old", or a movable body group D can be formed as a "movable body group consisting of movable bodies belonging to a movable body group A and movable bodies belonging to a movable body group C".

Also, the handling right setting/changing section 125 sets the handling right with respect to each article and/or each article group consisting of articles having the same attribute. The handling right can be individually set with respect to articles by setting the handling right with respect to each article. For example, the handling right of a specific medicine cabinet (medicine-cabinet-0001) is set. On the contrary, when the handling right is to be set with respect to articles having the same attribute, the handling right can be set with respect to all of articles having the attribute by setting the handling right with respect to each article group. For example, the handling right of articles having an attribute of a medicine cabinet is set. Thus, the same handling right can be set with respect to a medicine cabinet represented by medicine-cabinet-0001 and a medicine cabinet represented by medicine-cabinet-0002.

The handling right setting/changing section 125 automatically sets the handling right in accordance with the attribute of an article, sets the handling right in response to an input for setting the handling right provided by a user in the operation terminal 103, and automatically sets the handling right on the basis of the state of the environment as described below.

An example of the case where the handling right setting/changing section 125 automatically sets the handling right in accordance with the attribute of an article is a case where the handling right is set with respect to alcoholic drink or cigarettes having an age limit in accordance with the law. An electronic tag provided on such an article stores information of the age limit. Thus, the handling right setting/changing section 125 can automatically set the handling right of the article in response to the detection result obtained by the sensing means 120. In the case where the information is not stored in the electronic tag provided on the article, namely, in the case where there is no need to set the handling right in accordance with the attribute of the article, the handling right setting/changing section 125 may set the handling right to "all" so that all movable bodies can be permitted to handle the article.

The case where the handling right setting/changing section 125 sets the handling right in accordance with the setting input provided by a user will be described in detail later. Also, the case where the handling right setting/changing section 125 automatically sets the handling right of an article in accordance with the state of the article will also be described in detail later.

In this manner, the information of the handling right of each article set by the handling right setting/changing section 125 is stored in an article DB 161 (see FIG. 5) described below. Also, data of movable body groups is stored in a movable body DB 163 (see FIG. 7) described below.

(Article/Movable Body Database)

Figure 5:
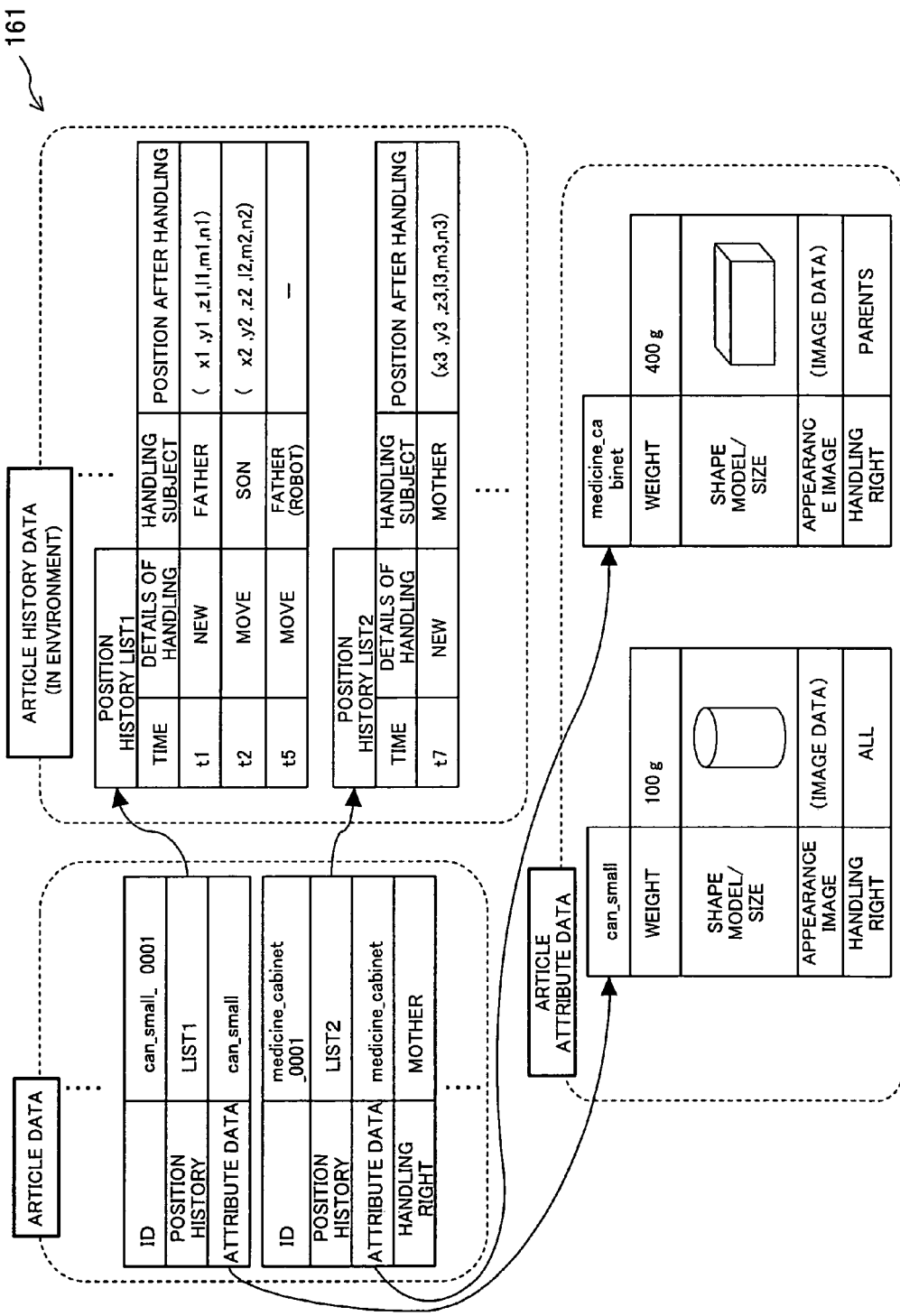
FIG. 5 is a diagram for showing a structure of an article database and exemplified contents thereof in an article/movable body database.
Figure 7:
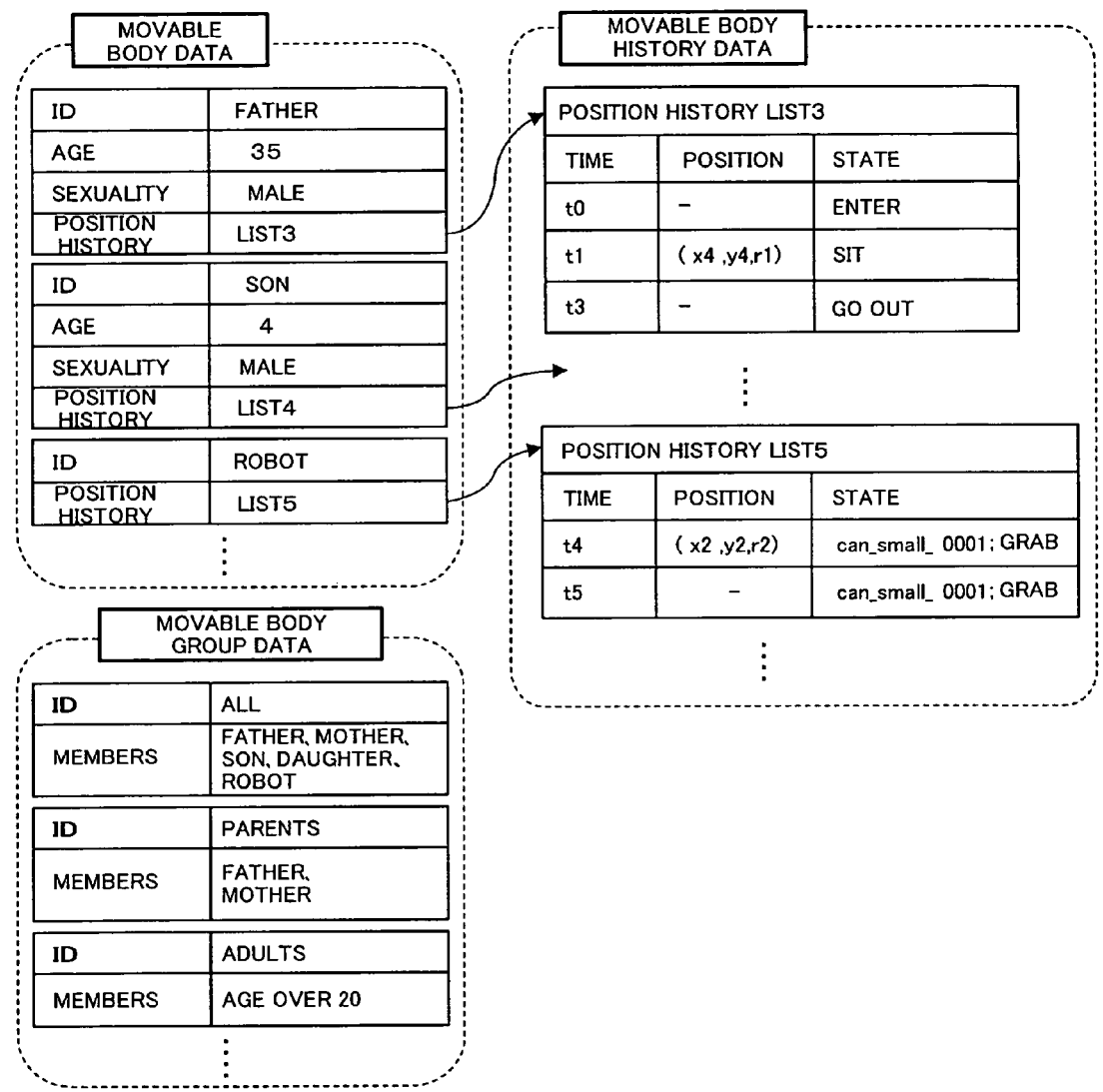
FIG. 7 is a diagram for showing a structure of a movable body database and exemplified contents thereof in the article/movable body database.

The article/movable body DB 160 of the environment management server 101 is a DB for storing information of articles and movable bodies, and has a structure, for example, as shown in FIGS. 5 through 7. Specifically, the article/movable body DB 160 includes the article database 161 and 162 (shown in FIGS. 5 and 6) for the articles and the movable body database 163 (shown in FIG. 7) for the movable bodies.

The article DB 161 includes sub-databases for respectively storing three kinds of data, that is, article data, article history data and article attribute data. Furthermore, the article history data includes history data obtained within the environment (see FIG. 5) and history data obtained at the doorway (see FIG. 6). The data contents stored in the respective sub-databases are as follows:

1) Article data: IDs for distinguishing respective articles, pointers to the article history data, pointers to the article attribute data and information of the handling right set with respect to each article are stored. A plurality of articles that are the same in the kind but are physically different are dealt with as different articles, and therefore, different IDs are allocated to these articles. On the other hand, since articles of the same kind have the same article attribute, these articles have the pointers to the same article attribute data although their IDs are different. Thus, the capacity of the database is saved.

Also, the handling right set in the "article data" corresponds to the handling right set with respect to each article.

2) (Environment) article history data: This is a sub-database for storing the history of handling of an article within the environment, and includes four items, that is, "handling time", "details of handling", "article handling subject" and "position after handling". Among these items, the data of a position can be variously expressed, and in this embodiment, the position is expressed by using six parameters as shown in FIG. 5. Specifically, the former three parameters (x1, y1, z1) represent the position (of the gravitational center or the like) of the article and the latter three parameters (l1, m1, n1) represent the facing direction of the article. The (article) handling subject of the article history data corresponds to the movable body identified by the article handling subject identifying part 33.

3) Article attribute data: This is a sub-database for storing physical attribute information of articles. Examples of the attribute information are, as shown in FIG. 5, the weight, the shape model, the size of an article and image data of its appearance. Also, the information of the handling right set with respect to the attribute of the article or an article group consisting of articles having the same attribute is stored as the "article attribute data".

In the example shown in FIG. 5, the handling right of articles (an article group) having the attribute of a medicine cabinet (medicine-cabinet) is set to a movable body group, "parents". On the other hand, the handling right of a specific medicine cabinet (medicine-cabinet-0001) is set to an individual movable body, "Mother".

4) (Doorway) article history data 162: This is a sub-database for storing the history of handling of articles at the doorway (which is a door in the example of FIG. 6), and includes five items, that is, "handling time", "handled article", "details of handling", "article handling subject" and "event".

Among these items, with respect to "details of handling", whether an article has been brought in the environment or it has been taken out of the environment is alternately set.

Furthermore, an "article name@bag C" listed in the item of "handled article" means that the article is put in a bag C in passing through the door. Articles put in a bag can be detected by providing a reader/writer on the bag C. In the example shown in FIG. 6, the database stores that Father took clothes A, a towel C and an umbrella B put in a bag C out of the environment (room) at time t9.

Moreover, the item of "event" is set when an article is taken out in connection with execution of an event. This item is registered by a user input. In the example shown in FIG. 6, that Father took the clothes A, the towel C and the umbrella B put in the bag C out of the environment (room) corresponds to a "business trip".

When the article history data 162 has such a structure, articles necessary for executing an event can be easily extracted. For example, when a "business trip" is specified, the articles having been taken out for the previous business trip can be extracted by referring to the item of "event" of the article history data 162. Thus, when a previously performed event is repeatedly executed, a user can easily check articles necessary for executing the event. Furthermore, when the user assigns the robot 102 a job to move the articles to a desired position or the server 101 automatically assigns the robot 102 the job, the articles necessary for executing the event are collected by the robot 102, and thus, the convenience for the user is largely improved.

The movable body DB 163 includes, as shown in FIG. 7, sub-databases respectively storing three kinds of data, that is, movable body data, movable body history data and movable body group data, and the data contents stored in the respective sub-databases are as follows:

1) Movable body data: IDs for distinguishing respective movable bodies, pointers to the movable body history data and attribute information of each movable body (that are an age and sexuality in the example shown in FIG. 7) are stored. Each movable body stored in the movable body data is previously registered manually by a user.

2) Movable body history data: This data includes three items, that is, time, the position of the movable body at the time and the state of the movable body at the time. At this point, a movable body occupies a large volume in the space differently from articles and hence can be an obstacle to the robot 102 moving in the environment. Therefore, the position of a movable body is preferably expressed as realistically as possible. In this embodiment, a region on the floor occupied by a movable body is expressed as a circle. Specifically, the position of a movable body is expressed by using the XY coordinate (x4, y4) of the center of the circle and the radius (r1) of the circle. Thus, the robot 102 can create its moving path keeping away from obstacles, and the position of each movable body can be expressed with necessary minimum information. It is noted that the position of a movable body may be expressed more strictly. For example, the position of a movable body may be expressed by approximating the outline of an area on the floor occupied by the movable body by using a plurality of line vectors.

Furthermore, the state of a movable body corresponds to a general human motion such as "sit", "stand", "lie" or "walk" if the movable body is a human, and corresponds to an operation performed on an article such as "grab" or "release" if the movable body is the robot 102. For example, a plurality of state candidates that can possibly be states of a movable body are previously prepared, and it is determined which state candidates the state of a movable body is applied to on the basis of the detection result obtained by the sensing means 120. In the movable body history data of the robot 102, not only the operation thereof but also the ID of an article related to the operation are stored in the form of "article ID: details of operation". Specifically, data is stored in the form of "can-small-0001: grab".

3) Movable body group data: IDs for distinguishing respective movable body groups and information of movable bodies belonging to the group are stored. Each movable body group consists of movable bodies registered in the movable body data.

(Environment Map Management Section and Environment Map)

The environment map management section 107 creates the environment map 108 on the basis of the information supplied from the sensing means 102, and manages the created environment map 108. The environment map 108 is used when the robot 102 moves in the environment. The robot 102 acquires the environment map 108 from the server 101 and makes a moving path plan as described later.

Also, when the control section 110 makes an inquiry to the environment map 108, the environment map management section 107 sends the control section 110 necessary information in accordance with the content of the inquiry, which will be described in detail later.

Figure 8A:
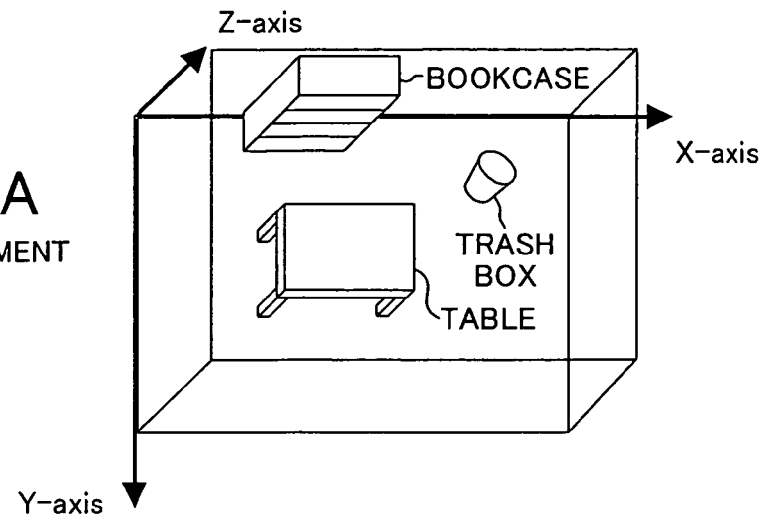
FIG. 8A is a diagram of an example of an actual condition of a space.
Figure 8B:
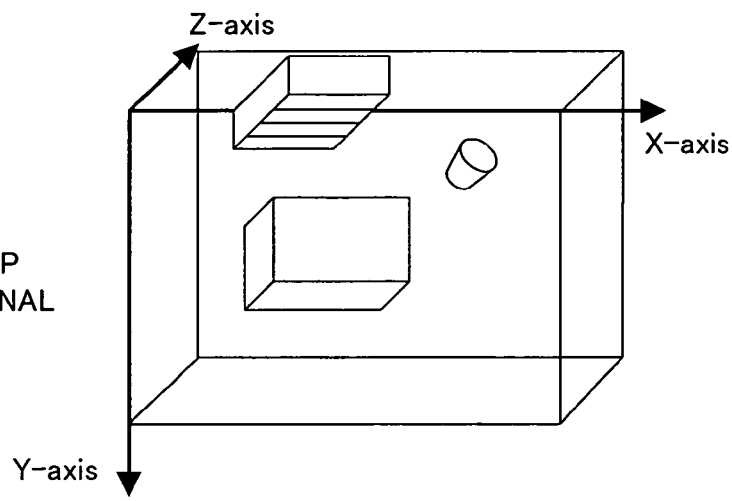
FIG. 8B is a diagram of an example of an environment map composed of three-dimensional models.
Figure 8C:
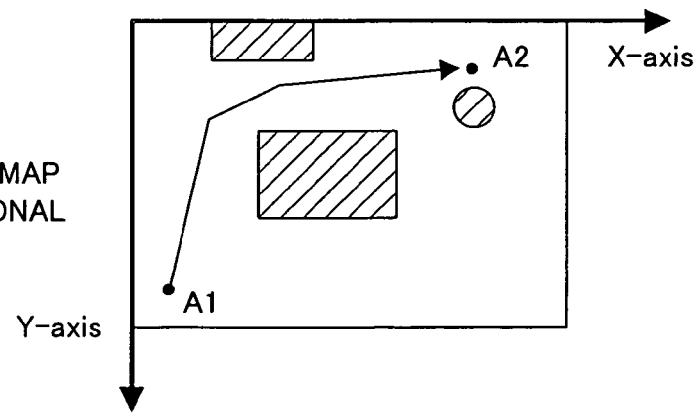
FIG. 8C is a diagram of an example of an environment map composed of two-dimensional models.

When the actual state of the environment is, for example, as shown in FIG. 8A, the environment map management section 107 may create an environment map 108 by simplifying the actual state by using three-dimensional models (as shown in FIG. 8B). Alternatively, the environment map management section 107 may create a two-dimensional environment map 108 by using plane models as shown in FIG. 8C. Alternatively, it may create an environment map 108 by directly using the actual state of the environment shown in FIG. 8A as three-dimensional models. In other words, the environment map management section 107 may create an environment map 108 in accordance with the use of the map and time (labor) that can be spent on the creation of the map. For example, in the case where it is necessary to create an environment map using three-dimensional models in a very short period of time, three-dimensional things present in the environment are changed into models in the shape of minimum rectangular parallelepipeds for covering the three-dimensional things. The environment map 108 shown in FIG. 8B corresponds to an example thus obtained, and in this example, a table and a bookcase are modeled as rectangular parallelepipeds and a trash box is modeled as a circular cylinder. An environment map using plane models is similar to this, and in the environment map 108 shown in FIG. 8C, a table and a bookcase are modeled as rectangular areas (hatched areas) obtained by orthogonally projecting them on a plane, and a trash box is modeled as a circular area (hatched area). In the map 108 using the plane models, the two rectangular areas and the circular area are set as an area where the robot 102 cannot move.

(Control Section)

The control section 110 of the environment management server 101 corresponds to a portion controlling the whole server, and principal controls thereof are as follows:

1) When the communication section 109 makes an inquiry about various data stored in the server, it determines the content of the inquiry and issues a data reference request to the article/movable body retrieval/management section 105 and the environment map management section 107 in accordance with the determination result.

2) It sends the result obtained in response to the request from the article/movable body retrieval management section 105 or the environment map management section 107 to the inquirer through the communication section 109.

3) It interprets a message about details of a job of a robot sent from the operation terminal 103 through the communication section 109, generates a robot control command string for making the robot 102 execute the job and sends the command string to the robot 102. A robot control command string will be described later.

4) It broadcasts the states of part or all of the articles managed by the article/movable body DB 160 and the state of the environment map 108 to the robot 102 or a user (i.e., the operation terminal 103) through the communication section 109 at given time intervals if necessary.

5) In response to the determination result obtained by the handling right determining part 34, it makes an informing section 123 and a warning section 124 connected to the server 101 execute informing and warning operations for a user.

6) In response to the determination result obtained by the handling right determining part 34, it sends a robot control command to the robot 102. Thus, a handling job of the robot 102 is terminated as described later.

7) In response to the determination result obtained by the handling right determining part 34, it sends an installation operation command to the installation 104. Thus, an electronic lock provided on the installation 104 is locked/unlocked as described later.

8) It automatically creates a robot control command string in consideration of the state of an article and sends the command string to the robot 102 as described later. Thus, without a user issuing a job instruction, the robot 102 automatically executes a job to handle an article.

The processing performed in the controls 1), 2) and 5) through 8) will be described in detail later.

-Architecture of Moving Robot-

The moving robot 102 corresponding to the second subsystem performs a job to handle an article.

As shown in FIG. 1, the robot 102 basically includes an obstacle sensor 111 for detecting an obstacle and the like present in the vicinity of the robot 102, a grabbing section 112 for grabbing an article, a movement planning section 113 for making a movement plan by using the environment map 108, a movement section 114 for moving the robot 102, the communication section 109 for sending/receiving various data to/from the environment management server 101 and the operation terminal 103, and the control section 115 for controlling the sensor 111 and the respective sections 109 and 112 through 114.

Figure 9:
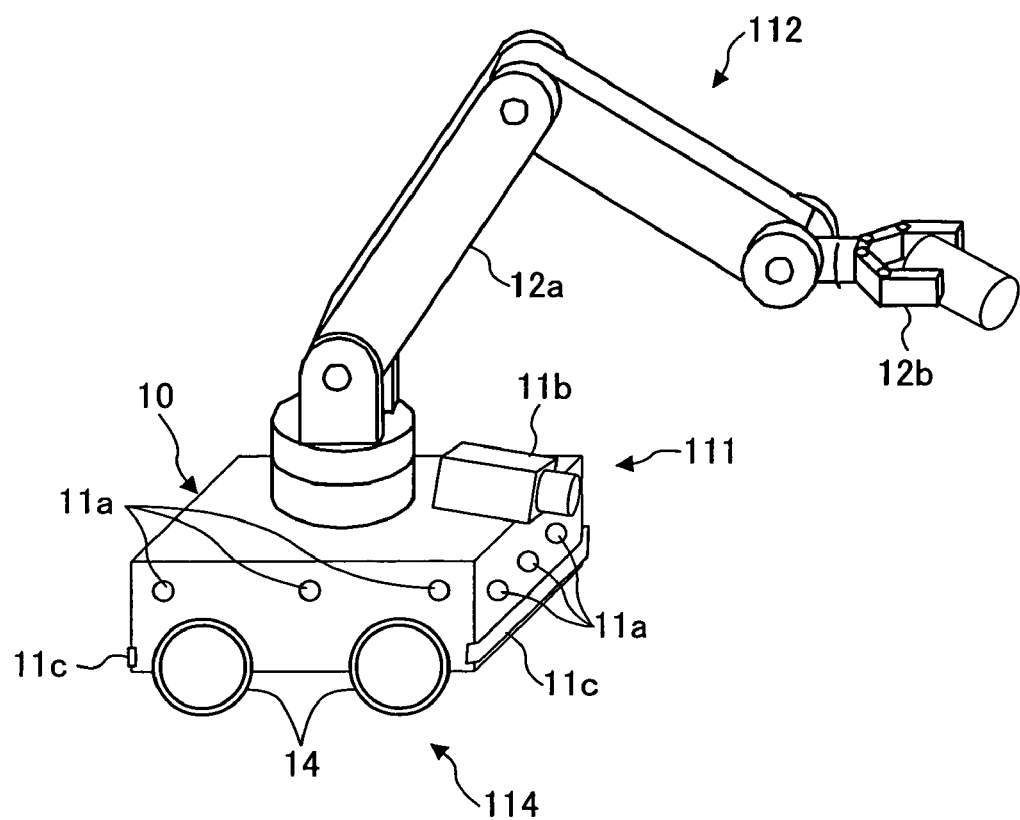
FIG. 9 is a schematic diagram for showing an example of the architecture of a moving robot.

FIG. 9 is a schematic diagram for showing an exemplified architecture of the robot 102 used in the present system. The robot 102 has a substantially box-shaped casing 10 for housing the movement planning section 114, the control section 115 and the like. In the following description, the right hand side on the drawing of FIG. 9 is designated as the front side, the left hand side is designated as the rear side, the side toward the bottom of the drawing is designated as the left hand side, and this side of the drawing is designated as the right hand side.

The grabbing section 112 is composed of an articulated arm 12a and a hand 12b provided at the tip of the arm 12a, and is mounted on the top face of the casing 10. The arm 12a and the hand 12b may use a motor-controlled actuator or another actuator such as an actuator using artificial muscle.

The movement section 114 is constructed from wheels 14, and two wheels 14 are provided on each of the right and left hand sides of the casing 10 (whereas the wheels provided on the left hand side are omitted in the drawing). Although the movement section 114 is constructed from the wheels 14 in this embodiment, the movement section 114 may employ any structure optimum to the environment in which the robot is used. For example, when the floor of the environment is rough, the movement section 114 is preferably constructed as a crawler unit or a multi-legged walking unit.

The obstacle sensor 111 includes ultrasonic sensors 11a, a camera 11b working: as a visual sensor and collision sensors 11c in this embodiment.

The ultrasonic sensor 11a is a sensor for calculating a distance from the sensor 11a to an obstacle by emitting ultrasonic waves and measuring a time elapsing until receiving reflected waves, and this sensor is used for detecting a near obstacle before the robot collides against it. The ultrasonic sensors are provided in the number of three on each of the side faces (i.e., the front face, the rear face and the right and left faces) of the casing 10.

The camera 11b is a sensor for determining whether or not there is an obstacle and for obtaining more accurate information of an article to be grabbed by receiving, as an input, a state around the robot 102 in the form of an image and by performing the recognition processing on the image. The camera 11b is mounted in a front portion of the casing 10.

The collision sensor 11c is a sensor for detecting a given impact force applied to the robot 102. For example, collision of an obstacle against the robot 102 or collision of the robot 102 against an obstacle during its movement is detected by using the collision sensor 11c. The collision sensor 11c is mounted on each of the front and rear faces of the casing 10.

The movement planning section 113 creates, by using the environment map 108, a moving path from a current position of the robot 102 to an objective position when the robot 102 is to execute a job. At this point, no obstacle should be present on the moving path from the current position to the objective position, and as described above, a movement inhibited area where the robot cannot move (such as the hatched areas in FIG. 8C) is set in the environment map 108. Therefore, when the moving path is created in areas other than the movement inhibited area, a moving path keeping away from obstacles can be created. For example, when a robot is moved from a position A1 to a position A2 by using the environment map 108 of FIG. 8C, a route for keeping away from the movement inhibited area in consideration of the size of the robot 102 (as shown with an arrow line in FIG. 8C) is created. For creating such a moving path, the most general Dijkstra method may be employed, or if the environment is complicated, a path search algorithm obtained by improving the Dijkstra method may be employed.

In order to cope with the case where the state of the environment is too complicated to calculate a moving path for the robot 102 or the calculation takes massive time, a mode for allowing a user to specify a moving path for a robot 102 may be provided.

The control section 115 of the moving robot 102 interprets a robot control command string mainly sent from the environment management server 101 and successively executes the robot control commands.

At this point, a robot control command corresponds to a command for controlling the grab of an article or the movement of the robot 102 itself, and the following three kinds of commands, that is, "move", "grab" and "release", are set in this embodiment.

1) (Move, Coordinate)

This is a command for moving the robot 102 from its current position to a position specified by the coordinate. The coordinate is specified by using a world coordinate system, and a moving path from the current position to the objective position is planned by the movement planning section 113.

2) (Grab, Article ID)

This is a command for grabbing an article specified by the article ID with the hand 12b. The position of the article is obtained by referring to the article DB and a grabbing plan is made by the grabbing section 112.

3) (Release)

This is a command for releasing the hand 12b.

The robot control commands are not limited to these three kinds of commands but may be increased in the number if necessary.

Although the moving robot 102 is an autonomous robot having the movement section 114 in this embodiment, the architecture of the moving robot 102 is not limited to this. The moving robot 102 may employ an architecture in which the grabbing section 112 composed of the arm 12*a* and the hand 12*b* is mounted on a guide rail installed on the ceiling of the environment. The moving robot 102 having this architecture can move within the environment by moving the grabbing section 112 guided by the guide rail, so that a job to move a specified article to a specified position in the environment can be executed.

Alternatively, the moving robot 102 may employ an architecture in which a plurality of grabbing sections 112 (each composed of the arm 12*a* and the hand 12*b*) are respectively fixed in given positions within the environment. In this case, the grabbing sections 112 are positioned so that all articles present in the environment can be grabbed by any of the grabbing sections 112. In the moving robot 102 having this architecture, when a specified article is to be moved to a specified position, one grabbing section 112 with a hand 12*b* capable of reaching the article is selected from the plural grabbing sections 112, the selected grabbing section 112 grabs the article, and the article grabbed with the arm 12*a* and the hand 12*b* is moved to the specified position. In the case where the target position for moving the article is beyond reach of the arm 12*a* of the grabbing section 112 selected for grabbing the article, the article is successively handed between a plurality of grabbing sections 112 before moving to the specified position.

-Architecture of Operation Terminal-

The operation terminal 103 corresponding to the third subsystem is a user interface of the present system, and is a terminal operated by a user mainly for instructing the robot 102 in an article handling job.

The operation terminal 103 basically includes, as shown in FIG. 1, a display section 117 composed of, for example, a CRT or a liquid crystal display for displaying various kinds of screens; an input section 116 composed of, for example, a pointing device or a keyboard for providing input in a screen displayed on the display section 117; a display control section 118 for performing display control for, for example, creating a screen to be displayed on the display section 117; the communication section 109 for sending, to the environment management server 101, details of a job of the robot 102 or the content of an inquiry input in the input section 116; and the control section 119 for controlling the sections 109 and 116 through 118.

The operation terminal 103 may be constructed by, for example, a general PC. In this case, the PC can be made to function as the operation terminal 103 by reading a control program.

On the display section 117 of the operation terminal 103, an operation screen for specifying details of a job of the robot 102, an input screen for inputting the content of an inquiry for an article (the content of retrieval of an article) to the server 101, and a setting screen for setting a handling right are displayed.

A user uses the operation terminal 103 for specifying the details of a job of the robot 102, making inquiry for an article registered in the article/movable body DB 160 to the server 101, and setting a handling right.

The operation terminal 103 performs user recognition processing when a user specifies the details of a job, inputs the content of an inquiry and sets a handling right. The recognition processing may be performed by allowing a password to be input in the operation terminal 103 or performed through biometrics recognition such as fingerprint recognition, face recognition, voice print recognition and iris recognition.

Information of a movable body (user) recognized through the recognition processing is utilized for identifying an article handling subject as described below.

-Architecture of Installation-

The installation 104 corresponding to the fourth sub-system is generally not moved but installed/fixed in the environment. In this embodiment, the installation 104 particularly includes a housing section for housing various articles and a door for opening/closing an opening of the housing section, and the door of the installation 104 is provided with an electronic lock.

The installation 104 includes, as shown in FIG. 1, the communication section 109 for receiving an installation operation command sent from the server 101; an operation section 127 for locking/unlocking the electronic lock of the installation 104; and the control section 126 for controlling the sections 109 and 127. Although merely one installation 104 is shown in FIG. 1, when a plurality of installations 104 are provided in the environment, the respective installations 104 are connected to the network.

The control section 126 operates the operation section 127 in accordance with an installation operation command sent from the server 101, thereby locking/unlocking the electronic lock. It is noted that the electronic lock can be manually locked/unlocked.

-Article Management Procedures-

Next, article management procedures employed in the article management system having the aforementioned architecture will be described with reference to FIGS. 5 through 7 and 10.

Figure 10:
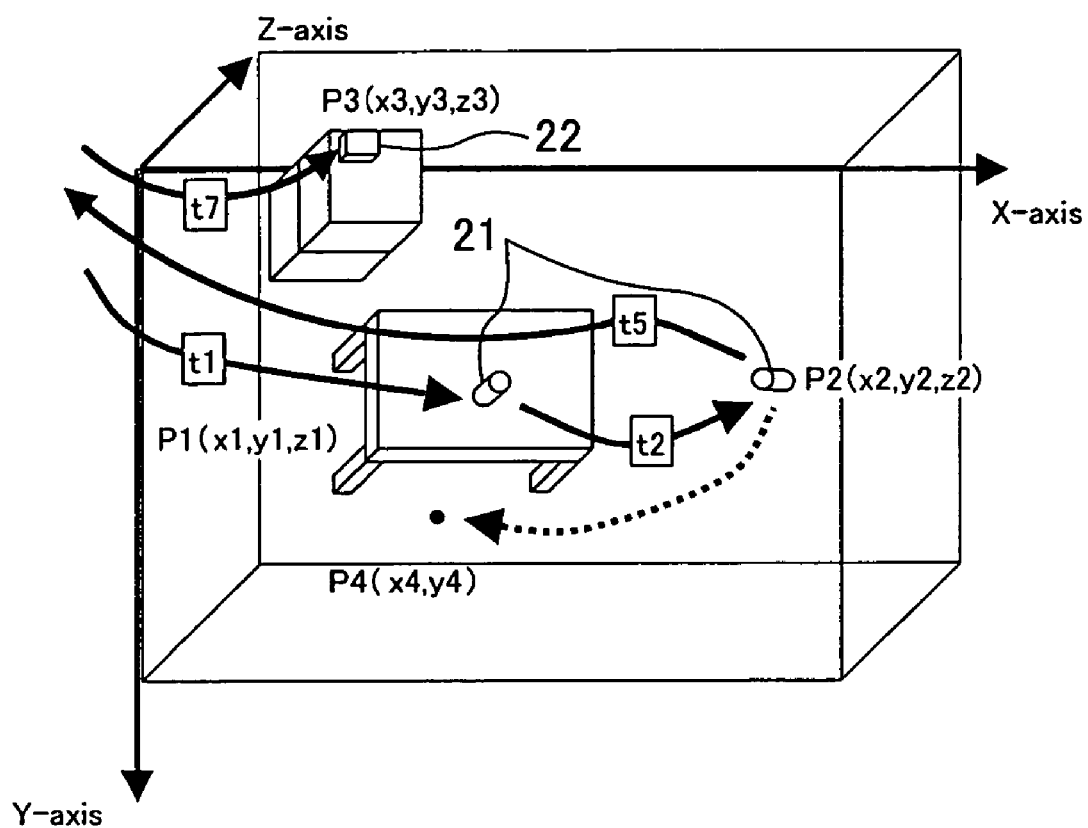
FIG. 10 is an explanatory diagram for showing examples of movements of articles in a space.

FIG. 10 is an overhead view for showing a given room (environment) of an ordinary house, and shows a canned juice 21 and a medicine cabinet 22 coming in and going out of this room and the canned juice 21 and the medicine cabinet 22 moved within the environment.

In this drawing, the movements of the canned juice 21 and the medicine cabinet 22 are shown with arrow lines, and letters t1, t2, t5 and t7 provided to these arrow lines indicate times of the movements of the canned juice 21 and the medicine cabinet 22 along the arrow lines. It is assumed that the time passes in the order of time t0 through time t7.

Although not shown in the drawing, a reader/writer working as the doorway sensing section 121 is provided at the entrance (door) of the room, so as to distinguishably detect ingress and egress of articles and movable bodies. Also, a reader/writer working as the environment sensing section 122 is provided in the room, so as to detect movements of articles and movable bodies within the environment.

It is also assumed that the canned juice 21, the medicine cabinet 22, persons and the robot 102 are respectively provided with electronic tags. The article attribute data of the canned juice 21 and the medicine cabinet 22 are obtained by reading information stored in their electronic tags with the reader/writer. It is assumed that information of respective movable bodies are registered in the movable body data of the movable body DB 163 and that the movable body history data is already initialized. Furthermore, it is assumed that the article DB 161 of article data is empty with no data recorded. Now, the processing performed by the system will be described by explaining a state obtained at each time.

(Time t0)

Father (not shown) registered in the movable body data of the movable body DB 163 enters the room through the door with the canned juice 21.

At this point, the doorway sensing section 121 provided at the door detects that a given movable body and a given article have entered the room. The detection result is sent from the sensing means 120 to the article/movable body retrieval/management section 105, and the article/movable body retrieval management section 105 having received the result identifies the article as the canned juice 21 and the movable body as Father. Then, it assigns an ID[can-small-0001] for the canned juice 21 and stores it in the article data in association with a pointer to the article attribute data (see FIG. 5). Additionally, the article/movable body retrieval/management section 105 stores the article attribute data of the canned juice 21.

Referring to the attribute data of the canned juice, the handling right is set to "all". This is because information of an age limit or the like is not stored in the electronic tag of the canned juice 21 and hence the handling right setting/changing section 125 sets the handling right of the attribute of the canned juice to "all". Movable bodies belonging to this movable body group are, as shown in the movable body group data of FIG. 7, Father, Mother, Son, Daughter and the robot.

Furthermore, the article/movable body retrieval/management section 105 creates a "position history list 1" for storing the movement history of the canned juice. At this point, the position history list 1 within the environment is empty.

Moreover, the article/movable body retrieval/management section 105 sets a content of the article history data 162 for managing passage of the article through the door (see FIG. 6). Specifically, the content is set as follows:

Time: t0
Article: can-small-0001
Details of handling: bring in
Article handling subject: Father On the other hand, in order to update the movable body history of Father detected by the sensing means 120, the article/movable body retrieval/management section 105 sets a content of a "position history list 3" by referring to the position history of ID "Father" included in the movable body DB 163 (see FIG. 7). Specifically, the content is set as follows:

Time: t0
Position: -
State: enter room

The position set as "-" in this case means that the movable body has moved from outside the environment into the environment. As the information of the position, the position information of the door having been passed through in entering the room may be set.

(Time t1)
Father sits in a position P4 (x4, y4) in the vicinity of a table and puts the canned juice 21 in a position P1 (x1, y1, z1) on the table.

This is detected by the environment sensing section 122, and in response to the detection result, the article/movable body retrieval/management section 105 sets a new content in the position history list 1 of the article history data 161 (see FIG. 5). Specifically, the content is set as follows:

Time: t1
Details of handling: new
Article handling subject: Father
Position after handling: P1 (x1, y1, z1, l1, m1, n1)

At this point, the details of handling set as "new" means that an article that was not present in the environment has been newly brought from the outside.

Also, the article/movable body retrieval/management section 105 sets a new content in the position history list 3 of the movable body history data 163 (see FIG. 7). Specifically, the content is set as follows:

Time: t1
Position: (x4, y4, r1)
State: sit (Time t2)
Son (not shown), that is, another movable body registered in the movable body data of the movable body DB 163, moves the canned juice 21 having been put in the position P1 (x1, y1, z1) to another position P2 (x2, y2, z2) on the floor.

The environment sensing section 122 and the article handling detecting part 31 of the article/movable body retrieval/ management section 105 detect this, and in response to the detection results, the article identifying part 32 identifies the article and the article handling subject identifying part 33 identifies the article handling subject. The handling right determining part 34 determines, in response to these identification results, whether or not Son has the handling right of the canned juice 21.

Specifically, the handling right determining part 34 first refers to the article data of the article DB 161 (see FIG. 5) so as to check whether or not the handling right is set with respect to the canned juice 21. In this case, the handling right is not set with respect to the canned juice 21. Therefore, the article attribute data is next referred to, so as to check the handling right set with respect to the attribute of the canned juice. In this case, the handling right is set to the movable body group "all". As set in the movable body group data of the movable body DB 163, the movable body group "all" includes Son, and hence, it is determined that Son has the handling right of the canned juice. Accordingly, in this case, Son is not restrained from handling the canned juice 21.

The article/movable body retrieval/management section 105 sets a new content in the position history list 1 of the article history data 161 (see FIG. 5). Specifically, the content is set as follows:

Time: t2
Details of handling: move
Article handling subject: Son
Position after handling: position P2 (x2, y2, z2, l2, m2, n2)

At this point, the details of handling is "move" because the article having been registered in the article history data has been moved within the environment. Since the position of Son is changed at time t2, the article/movable body retrieval/ management section 105 sets a new content in the movable body history data 163 of Son (a position history list 4) in response to the detection result obtained by the environment sensing section 122, which is herein omitted.

(Time t3)
Father goes out of the room.

This is detected by the environment sensing section 122, and the article/movable body retrieval/management section 105 sets a new content in the position history list 3 of the movable body history data 163 (see FIG. 7). Specifically, the content is set as follows:

Time: t3
Position: -
State: go out

Since the position is set as "-" at this point because the environment sensing section 122 cannot detect Father since he has gone out of the environment. As the information of the position, the position information of the door having passed through in going out may be set.

Furthermore, Father operates the operation terminal 103 before going out of the room so as to input a job instruction for the robot 102. The content of the job instruction is to move the canned juice 21 to a given position out of the environment.

(Time t4)

The robot 102 having received the job instruction through the server 101 moves to the position P2 (x2, y2) of the canned juice and grabs the canned juice.

This is detected by the environment sensing section 122 and the handling right determining part 34 of the article/movable body retrieval/management section 105 makes a determination about the handling right. In this case, although the actual article handling subject is the robot 102, the subject having issued the job instruction to the robot 102 is identified as the article handling subject in the present system. As described above, the user recognition processing is performed in specifying the details of the job of the robot 102 in the operation terminal 103, and therefore, the subject (article handling subject) having issued the job instruction is identified on the basis of the recognition result. Accordingly, the article handling subject of this case is Father. Since the handling right of the canned juice is set to "all", Father has the handling right of the canned juice. Therefore, the job of the robot 102 to move the canned juice 21 is not restrained.

The article/movable body retrieval/management section 105 sets a new content in the movable body history data of the robot 102 (a position history list 5) (see FIG. 7). Specifically, the content is set as follows:

Time: t4
Position: (x2, y2, r2)
State: [can-small-0001]: grab

The operation of the robot 102 may be detected by the environment sensing section 122 or may be detected by the server 101 receiving operation information from the robot 102.

(Time t5)

The robot 102 moves out of the environment through the door with the canned juice 21 grabbed.

This is detected by the environment sensing section 122 and the article/movable body retrieval/management section 105 sets a new content in the position history list 5 of the movable body history data 163 (see FIG. 7). Specifically, the content is set as follows:

Time: t5
Position: -
State: [can-small-0001]: grab

Also, the article/movable body retrieval/management section 105 sets a new content in the position history list 1 of the article history data 161 (see FIG. 5). Specifically, the content is set as follows:

Time: t5
Details of handling: move
Article handling subject: Father (robot)
Position after handling: -

In this manner, when the robot 102 handles an article, the article/movable body retrieval/management section 105 records, in the article history data 161, the subject having issued the job instruction to the robot 102 as the article handling subject.

Furthermore, since the doorway sensing section 121 detects the passage of the robot 102 through the door with the canned juice 21 grabbed, the article/movable body retrieval/management section 105 sets a new content in the article history data 162 for managing the passage of the article through the door (see FIG. 6). Specifically, the content is set as follows:

Time: t5
Article: can-small-0001
Details of handling: take out
Article handling subject: Father (robot)

Also in the article history data 162 obtained at the door, when the robot 102 is the actual article handling subject, the subject having issued the job instruction to the robot 102 is recorded as the article handling subject.

(Time t6)

Mother, that is, still another movable body registered in the movable body data of the movable body DB 163, enters the room through the door with the medicine cabinet 22.

The doorway sensing section 121 detects that Mother and the medicine cabinet 22 have entered the room. The article/movable body retrieval/management section 105 assigns ID [medicine-cabinet-0001] for the medicine cabinet 22 and stores it in the article data in association with a pointer to the article attribute data.

At this point, referring to the attribute data of the medicine cabinet, the handling right is set to "parents". Movable bodies belonging to this movable body group is, as shown in the movable body group data of FIG. 7, Father and Mother. It is assumed that the handling right is set by the handling right setting/changing section 125 in response to an input for setting the handling right provided in the operation terminal 103 by Father or Mother.

Also, the article/movable body retrieval/management section 105 creates a "position history list 2" for storing movement history of the medicine cabinet 22 (see FIG. 5). At this point, the position history list 2 is empty.

The article/movable body retrieval/management section 105 sets a new content in the article history data 162 for managing the passage of the article through the door (see FIG. 6). Specifically, the content is set as follows:

Time: t6
Article: medicine-cabinet-0001
Details of handling: bring in
Article handling subject: Mother (Time t7)

Mother puts the medicine cabinet 22 in a position P3 (x3, y3, z3) on a refrigerator.

This is detected by the environment sensing section 122, and the article/movable body retrieval/management section 105 sets a content of the position history list 2 of the article history data 161 (see FIG. 5). Specifically, the content is set as follows:

Time: t7
Details of handling: new
Article handling subject: Mother
Position after handling: P3 (x3, y3, z3, l3, m3, n3)

It is noted that the movable body data and the movable body history of Mother are omitted in FIG. 7.

In the aforementioned manner, the article/movable body retrieval/management section 105 stores/updates information of articles and movable bodies in the article/movable body DB 160. In the aforementioned exemplified case, the database is updated every time each of the articles and movable bodies registered in the article/movable body DB 160 is changed in its position. The update timing for the database is not limited to this but may be appropriately set.

Next, Mother operates the operation terminal 103 so as to set the handling right of the medicine cabinet 22 to herself alone. In response to the input of this setting, the handling right setting/changing section 125 of the server 101 sets the handling right of the medicine cabinet 22 (medicine-cabinet-0001) to Mother in the article data of the article DB 161 (see FIG. 5).

Under this condition, when Son tries to move the medicine cabinet 22, this is detected by the environment sensing section 122. In response to the detection result, the article/movable body retrieval/management section 105 makes a determination about the handling right. In this case, since the handling right of the medicine cabinet 22 (medicine-cabinet-0001) is set to "Mother", the handling right determining part 34 determines that Son does not have the handling right of the medicine cabinet 22. In response to the determination result, the control section 110 executes a warning operation by the warning section 124. The warning section 124 performs the warning operation within the environment where the article is handled. For example, it may warn with a voice "You do not have the handling right". The warning operation performed by the warning section 124 is not limited to such a speech but a warning display may be displayed on, for example, the display section 117 of the operation terminal 103 or a television, a computer display or a projector provided in the room. Thus, not only Son handling the article is warned but also another movable body (for example, Mother) present in the environment is warned, so that it can be expected that Son is stopped handling the article.

Furthermore, the control section 110 executes an informing operation by the informing section 123. The informing section 123 performs the informing operation (to inform that Son is handling the medicine cabinet 22 in this case) outside the environment where the article is handled. In particular, the informing section 123 preferably informs a movable body having the handing right of the medicine cabinet 22 (namely, Mother in this case). This informing operation is performed, for example, by using an e-mail or a telephone, and for this purpose, a method for making contact with each movable body is preferably registered in the movable body data of the movable body DB 163. Also, the informing section 123 may produce an informing display on a television, a computer display or a projector provided in another environment (where any other movable body is present) apart from the aforementioned environment, or may inform with a voice in another environment where any other movable body is present. Such an informing operation is effective, for example, to inform a parent that an infant is to handle a medicine, a cigarette or alcoholic drink in the absence of the parent.

In this manner, handling of an article by a movable body without the handling right is restrained in the present system.

Furthermore, it is assumed that Son operates the operation terminal 103 to input a job instruction to the robot 102. The content of the instruction is assumed to be to move the medicine cabinet 22 to himself. Since the subject having issued the job instruction to the robot 102 is identified as the article handling subject in the present system as described above, handling of the article by the robot 102 is restrained similarly to the case where Son himself is to handle the article. Specifically, the environment sensing section 122 detects that the robot 102 is to handle the medicine cabinet 22. In response to the detection result, the article/movable body retrieval/management section 105 makes a determination about the handling right. In response to the determination result obtained by the handling right determining part 34 (which is a result that Son does not have the handling right in this case), the control section 110 sends a robot control command to the robot 102. This robot control command is a command for terminating the job of the robot 102 to handle the article. The robot 102 having received the robot control command terminates the job. Thus, a movable body not having the handling right is restrained from handling the article by using the robot 102. Also, the control section 110 sends a control signal to the operation terminal 103, so as to produce a display that Son does not have the handling right on the display section 117 of the operation terminal 103. The display section 117 may display a warning sentence such as "You do not have the handling right.", or display a symbol or an illustration for suggesting lack of the handling right (such as "X").

Furthermore, in order to definitely prevent a movable body not having the handling right from handling an article, the server 101 may operate the installation 104.

Specifically, when the article handling subject does not have the handling right of an article, the control section 110 of the server 101 sends an installation operation command to the installation 104 in response to the determination result obtained by, the handling right determining part 34. The control section 126 of the installation 104 having received the installation operation command controls the operation section 127 so as to lock the electronic lock. Thus, when the article to be handled by the movable body is housed in the housing section of the installation 104, the door cannot be opened, and hence, the movable body can be definitely preventing from handling the article.

Also, when the article handling subject identified by the article handling subject identifying part 33 is not registered in the movable body data of the movable body DB 163, or when the article handling subject identifying part 33 cannot identify the article handling subject, it may be presumed that a suspect having entered the environment is handling the article. Therefore, in such a case, the control section 110 of the server 101 performs a warning operation by the warning section 124 or an informing operation by the informing section 123 as described above, and in addition, it may contact the police or a security company. Also, an image of the suspect may be captured by using the camera provided in the environment as the sensing means 120 so as to store the camera image. Furthermore, when any article is housed in the installation 104, the server 101 sends an installation operation command to the installation 104 for locking the door of the installation 104 as described above, so that the article cannot be handled by the suspect. In addition, the control section 110 of the server 101 may send a robot control command to the robot 102, so as to make the robot 102 disturb the suspect handling the article or catch the suspect.

Even when Mother sets the handling right of the specific medicine cabinet 22 (medicine-cabinet-0001) to "Mother" as described above, the handling right of the attribute of a medicine cabinet (medicine-cabinet) remains to be set to "parents" in the article attribute data of the article DB 161. Therefore, for example, Father is restrained from handling the medicine cabinet 22 because he does not have the handling right of the medicine cabinet 22, but he is not restrained from handling a medicine cabinet other than the medicine cabinet 22 (for example, medicine-cabinet-0002) because Father belongs to the movable body group "parents".

In this manner, since the handling right can be set with respect to the attribute of articles, the handling right of articles having the same attribute can be set as a whole, and hence, the handling right can be easily set. On the other hand, since the handling right can be set also with respect to each of individual articles, the handling rights of the articles can be finely set.

The method for setting the handling right in the operation terminal 103 is not limited to the input in the input section 116 but the handling right may be set with a voice. For example, when a speech of "the handling right of the medicine cabinet is set to Mother" is emitted, the handling right setting/changing section 125 sets the handling right of the medicine cabinet to Mother.

Furthermore, user authority for setting a handling right may be provided. In this case, the recognition processing is performed when a user operates the operation terminal 103, so as to identify a user having the authority to set the handling right.

In the present system, various information of articles are stored in the article/movable body DB 160. Therefore, in the present system, a user can retrieve a desired article by operating the operation terminal 103.

Specifically, a user operates the input section of the operation terminal 103 so as to input a retrieval condition for an article. Since the article DB 161 stores not only the names of articles but also the article attribute data and the article history data as shown in FIG. 5, the retrieval can be performed by using, as a retrieval key, the kind of article, an article handling subject, handling time, a handling right or the like. In inputting the retrieval condition in the operation terminal 103, such a retrieval key may be input.

Alternatively, for example, a colloquial sentence such as "Who moved where money put on a table approximately at Time tt on Day dd of Month mm?" may be input.

The information of the retrieval condition input in the operation terminal 103 is sent to the environment management sever 101 through the network. The article/movable body retrieval/management section 105 of the server 101 having received the information refers to the article/movable body DB 160, so as to retrieve information according to the specified condition. Any general method can be employed as the retrieval method for the information.

The retrieval result obtained by the article/movable body retrieval/management section 105 is sent from the server 101 to the operation terminal 103 through the network. The operation terminal 103 having received the retrieval result presents the retrieval result to the user. For example, with a map of the environment displayed on the display section 117, the current position of the article may be indicated on the map. Alternatively, the information can be presented to the user with a speech such as "The article has been moved onto a shelf by Mother".

Also when the user makes such an inquiry to the server 101, the handling right determining part 34 preferably determines whether or not the movable body making the inquiry has the handling right of the article related to the inquiry. In accordance with the determination result, when the movable body making the inquiry does not have the handling right of the article related to the inquiry, information such as "The article has been moved onto a shelf by Mother but you cannot handle it because you do not have the handling right." may be presented to the user. Alternatively, when the movable body making the inquiry does not have the handling right, the inquiry itself may be restrained by presenting information such as "no answer can be made" or "there is no such article" to the user.

In setting the handling right of an article, not only the handling right in direct handling such as moving of the article but also the handling right for handling information such as retrieval of the article may be set in the handling right setting/changing section 125.

Furthermore, the handling right setting/changing section 125 may set a handling right with which an article can be handled within the environment but cannot be taken out of the environment. In this case, when the doorway sensing section 121 detects that an article handling subject takes an article out, the handling right determining part 34 determines whether or not the article handling subject has the handling right of the article, and in accordance with the determination result, the control section 110 makes the warning section 124 perform a warning operation or the informing section 123 perform an informing operation.

Moreover, the handling right setting/changing section 125 may set a handling right with which an article is restrained from being brought into the environment.

-Setting/Changing of Handling Right in Accordance with State of Environment-

Next, a setting/changing operation for a handling right performed by the handling right setting/changing section 125 will be described.

(Automatic Setting of Handling Right)

As one of automatic setting, the handling right setting/changing section 125 automatically sets the handling right of an article on the basis of the handling history of the article. Also, when a new article is brought into the environment, the handling right setting/changing section 125 sets the handling right of the article to a movable body that brings the article.

First, the automatic setting of a handling right on the basis of the handling history of an article will be described with reference to FIGS. 11 through 13.

Figure 11:
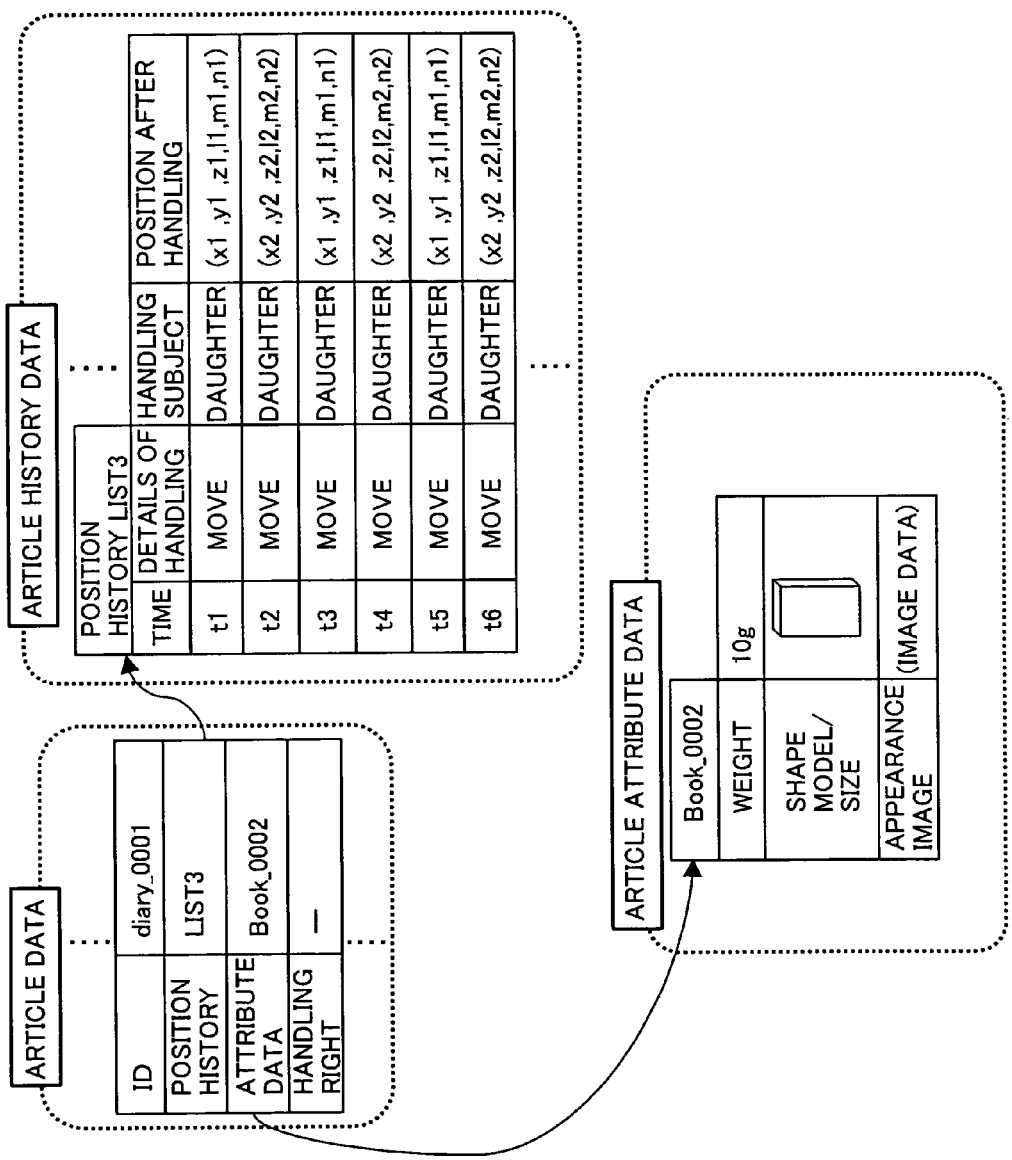
FIG. 11 is a diagram for showing exemplified contents of an article database.
Figure 12:
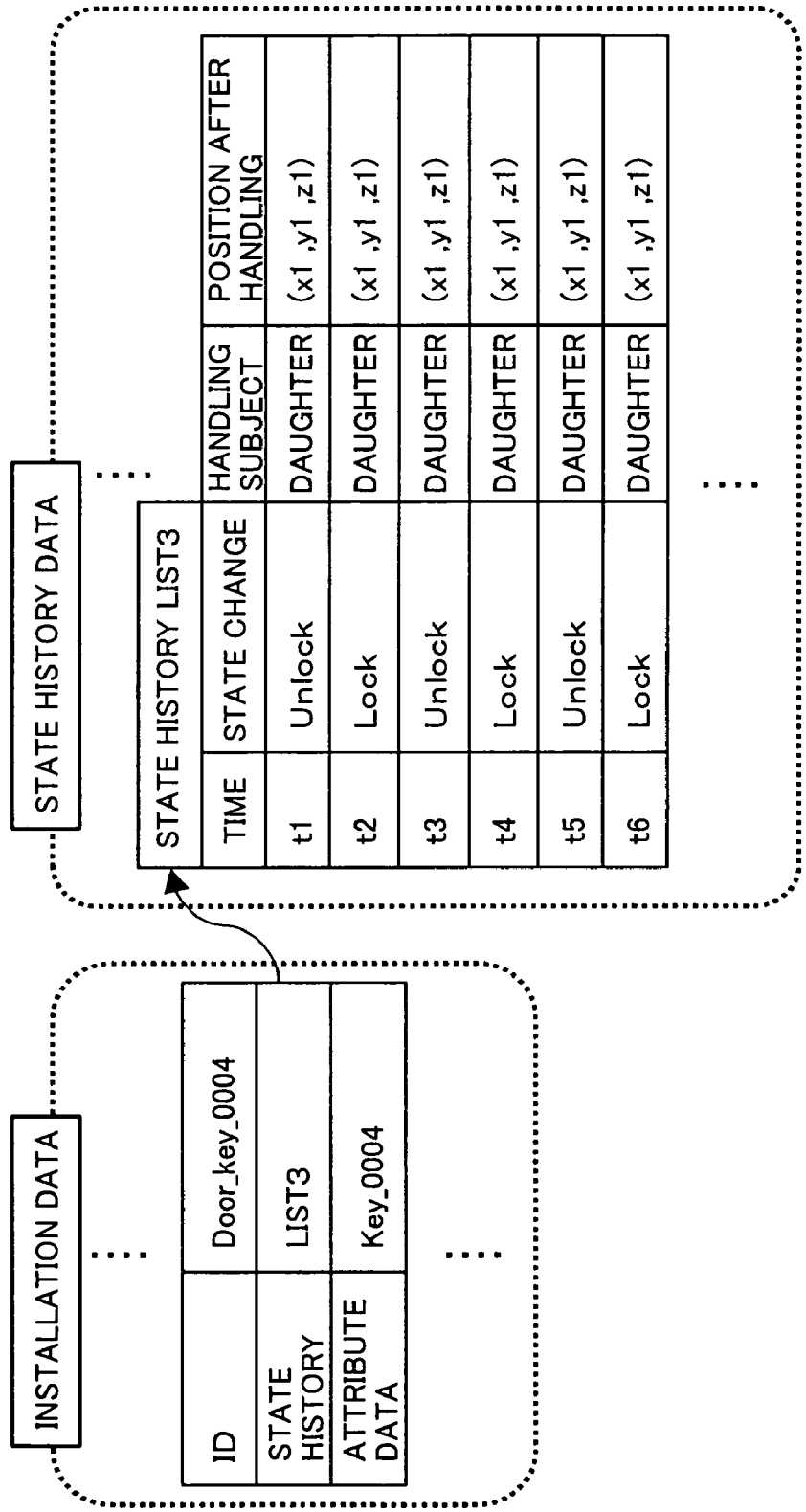
FIG. 12 is a diagram for showing a structure of installation data and exemplified contents thereof.

FIG. 11 shows the article DB 161 of a diary (ID: diary_0001). The article attribute data of the diary is obtained from an electronic tag provided on the diary and is recorded in the article attribute data. It is herein assumed that the handling right of the diary is not set.

Also, it is assumed that through the aforementioned article management performed by the sensing means 120 and the server 101, the handling history of the diary is already recorded in the article history data 161 of the diary.

Referring to the article history data 161, it is found that the handling subject of the diary is Daughter and any movable body other than Daughter has not handled the diary. When the article handling subject is limited to a specific movable body in this manner, the handling right can be set. Therefore, in the exemplified case of FIG. 11, the handling right setting/changing section 125 sets the handling right of the diary (ID: diary_0001) to Daughter. At this point, the handling right setting/changing section 125 may inform Daughter of the setting of the handling right before registering the set handling right in the database.

When the article handling subjects are found, on the basis of the article handling history, to be limited to movable bodies having a specific attribute (i.e., a movable body group), the handling right of the article is set to the movable body group. Alternatively, when handling subjects of articles having a specific attribute (i.e., an article group) are found, on the basis of the article handling history, to be limited to a specific movable body (or a specific movable body group), the handling right of the article group is set to the movable body (or the movable body group).

In the above, the handling right is set on the basis of the article history data 161, and a tidy position or a tidy state of an article can be set on the basis of the article history data 161. In the article history data 161 shown in FIG. 11, it is assumed that time periods between times t1 and t2, t3 and t4, and t5 and t6 are sufficiently shorter than time periods between times t2 and t3 and t4 and t5. In this case, it is found that the diary is put in a position (x2, y2, z2) along a direction (l2, m2, n2) for a long period of time. Also, it is assumed that the position (x2, y2, z2) corresponds to the inside of a drawer of a desk placed in a room of Daughter and that the drawer is provided with a lock. Furthermore, as shown in FIG. 12, it is assumed that the state history of the lock is recorded as data corresponding to the state of the installation 104 in the server 101 stored as the installation data and the state history data. In the state history data, state change of "Unlock" corresponds to the drawer being unlocked and "Lock" corresponds to the drawer being locked.

Referring to the state history data and the article history data 161, it is found that the drawer is always locked when the diary is put in the drawer.

Therefore, the tidy position and the tidy state of the diary can be set as follows:

Tidy position: (x2, y2, z2, l2, m2, n2)
Tidy state: Door_key_0004, Lock

The handling right, the tidy position and the tidy state thus automatically set are registered as the article data in the database as shown in FIG. 13. Before registering the tidy position and the tidy state thus set, a movable body having the handling right of the article may be informed of the setting of the tidy position and the tidy state, so that the movable body can check the tidy position and the tidy state. Also, the tidy position and the tidy state of an article may be manually set by a movable body having the handling right of the article.

Also after setting the handling right, the tidy position and the tidy state once on the basis of the article history data in the aforementioned manner, the handling right, the tidy position and the tidy state may be automatically changed on the basis of the article history data. In other words, learning can be continued. Also, a movable body having the handling right may instruct the system to stop learning.

Furthermore, a case where the handling right, the tidy position and the tidy state are set through learning and a case where they are not set can be switched in accordance with the attribute of an article. For example, with respect to an article frequently used, such as a notebook or a bag, the handling right, the tidy position and the tidy state may be set through learning without setting them through learning with respect to an article not frequently used. The electronic tag provided on an article may store information whether or not the learning is employed.

Alternatively, a movable body having the handling right may change the tidy position and the tidy state automatically set. When the tidy position and the tidy state are changed, if a plurality of movable bodies have the handling right of the article, all the movable bodies having the handling right are preferably informed of the change. Alternatively, the tidy position and the tidy state cannot be changed as far as all the movable bodies having the handling right permit the change.

Next, automatic setting of a handling right performed when a new article is brought into the environment is performed as follows:

As described above, the doorway sensing section 121 detects that an article has been brought into the environment by a movable body, and the article and the movable body are identified by the article/movable body retrieval/management section 105. When the article and the movable body are identified in this manner, the handling right of the article is set to the movable body. Through this processing, for example, in the case where a large number of new articles are brought into the environment after shopping, the handling rights of the respective articles are efficiently set.

(Article Tidying Job of Robot)

When the tidy position and the tidy state of an article are set in the aforementioned manner, it is possible to make the robot automatically execute a tidying job for the article on the basis of the data. This will be described with reference to FIG. 13.

First, Daughter having the handling right of the diary takes the diary out of the drawer of the desk and moves it to a position (x1, y1, z1, l1, m1, n1). It is assumed that she leaves the room thereafter without moving the diary to the drawer corresponding to the tidy position of the diary. The sensing means 120 detects that the diary is left in the position (x1, y1, z1, l1, m1, n1) and that Daughter is not in the vicinity of the diary.

When an article is continuously left in a position different from the tidy position in this manner, the server 101 makes the robot 102 execute a job to move the article to the set tidy position. At this point, if the handling right of the article is set to a specific movable body alone, the robot 102 cannot automatically execute the article handling job. Therefore, the handling right setting/changing section 125 of the server 101 temporarily invalidates the handling right set with respect to the article, so that the robot 102 can execute the article handling job.

In the aforementioned case, since the handling right of the diary is set to Daughter, the handling right setting/changing section 125 temporarily invalidates the handling right of the diary. Then, the control section 110 of the server 101 sends the robot 102 a robot control command for moving the diary present in the position (x1, y1, z1, l1, m1, n1) to the tidy position (x2, y2, z2, l2, m2, n2). The robot 102 having received the robot control command moves to the position (x1, y1, z1, l1, m1, n1), grabs the diary, and thereafter, moves to the position (x2, y2, z2, l2, m2, n2) and releases the diary. Thus, the diary is kept in the drawer of the desk corresponding to its tidy position. Also, since the tidy state of the diary is set, the control section 110 of the server 101 sends an installation operation command to the desk for locking the drawer. The desk having received the installation operation command locks the drawer.

After moving the diary to the tidy position and placing it in the tidy state, the handling right setting/changing section 125 switches the handling right of the diary to be valid. Thus, the handling right of the diary is set to Daughter again.

When a movable body having the handling right of an article is present in the vicinity of the left article, an article tidying job of the robot 102 is not executed. Alternatively, the tidying job may be executed after confirming the movable body having the handling right about execution of the tidying job and the movable body permits the job. Alternatively, a movable body having the handling right may previously set whether or not the tidying job for the article is automatically executed by the robot 102.

Although the handling right is temporarily invalidated in the aforementioned processing, the handling right setting/changing section 125 may make the robot 102 execute the tidying job by temporarily setting the handling right to the robot 102.

Such an article tidying job of the robot is particularly effective with respect to an article that is restrained from being handled by a specific movable body. As described above, for example, a medicine cabinet is an article preferably restrained from being handled by a child. Therefore, a medicine cabinet is put on, for example, drawers that cannot be reached by a child. However, when somebody forgets to return the medicine cabinet to its predetermined tidy position or when the medicine cabinet is dropped from the tidy position by an earthquake, the medicine cabinet may be left in a position where a child can reach. When the sensing means 120 detects that the medicine cabinet is left in a position different from its tidy position, the handling right of the medicine cabinet is temporarily invalidated and the robot 102 is made to execute a tidying job for the medicine cabinet in the aforementioned manner. Thus, danger can be prevented beforehand.

Apart from the job of the robot 102 to automatically tidying an article, when a movable body having the handling right issues a job instruction to the robot 102, the robot 102 naturally executes a job for tidying an article.

(Change of Handling Right in Accordance with State of Article)

In a life space such as an ordinary house, an office, a hotel, a shop and a hospital, the states of articles are changed with time. When handling rights once set are not kept but changed in accordance with the change of the states, various conveniences can be attained. One of the examples is the aforementioned article tidying job of the robot 102 performed with the handling right invalidated. Now, processing for changing the handling right will be described by using examples other than this.

1) Processing for Changing Handling Right of Article in Accordance with Position Thereof An exemplified case for performing this processing is management of clothing. FIG. 14 shows article data of a shirt (ID: shirt-0001). As compared with the article data shown in FIG. 13, the article data of FIG. 14 additionally includes an item, "article state". The "article state" includes "Son's room" and "Dressing room", and the handling right, the tidy position and the tidy state are set with respect to each state. Specifically, when the shirt (ID: shirt-0001) is present in the Son's room, the handling right is set to Son, the tidy position is set to "drawers", and the tidy state is set to "folded". On the other hand, when the shirt (ID: shirt-0001)) is present in the dressing room, the handling right is set to "all", the tidy position is set to a "laundry basket" and the tidy state is not set.

In this manner, when the shirt is present in the Son's room, since the handling right is set to "Son", another movable body cannot handle the shirt. Also, since the tidy position and the tidy state are respectively set, when the shirt is left, for example, on the floor of the Son's room, the handling right is temporarily invalidated by the handling right setting/changing section 125 so that the robot 102 can execute a tidying job as described above. Thus, the shirt is folded to be kept in the drawers.

On the other hand, when the shirt is present in the dressing room, the handling right is set to "all". Therefore, all movable bodies can handle it. This is because clothing left in the dressing room is presumed to be washed and hence the convenience can be improved not by allowing a specific movable body alone to handle it but by allowing all the movable bodies to handle it.

Alternatively, when the shirt is left in a position other than in the laundry basket, the tidying job of the robot 102 is executed. In this case, since the handling right is set to "all", the handling right of the shirt is set also to the robot 102, and hence, the robot 102 can execute the tidying job for the shirt without the handling right setting/changing section 125 invalidating the handling right.

Although the handling right set with respect to an article is changed in the above-described processing, the handling right set with respect to an article group can be changed.

As another example, when an article is thrown away in a trash box, the handling right set with respect to the article may be invalidated or changed to "all". Thus, all movable bodies can discard the trash. However, when the handling right is changed to "all", it is preferred that the details of handling are limited to discarding the trash with other details of handling restrained. This is for preventing invasion of privacy or leakage of secret by preventing an outsider from seeing the trash.

At this point, processing in changing the handling right will be described. When the handling right is changed, the server 101 preferably informs movable bodies of the change of the handling right by using the informing section 123. The movable bodies to be informed at this point are a movable body having had the handling right and a movable body newly provided with the handling right through the change. Alternatively, merely when a movable body newly provided with the handling right is present in the vicinity of the article, the movable body may be informed of the change.

As still another example, processing performed in the case where a plurality of articles are contained in one container and the handling rights of the plural articles are set to different movable bodies will be described. A specific example is clothing put in a laundry basket.

In this case, the handling rights of the articles contained in the container are different and in addition, the handling rights of the articles are different from the handling right of the container. Therefore, there arises a problem that it should be determined who is allowed to handle the container containing the articles.

In such a case, the handling right set with respect to the container containing the articles is preferred, and processing for temporarily invalidating the handling rights of the articles contained in the container, for changing the handling rights of the articles to accord with the handling right set with respect to the container, or for additionally setting the handling right set with respect to the container to movable bodies having the handling rights of the articles. Thus, the handling rights of the articles are made to accord with the handling right of the container, so that a specific handling right can be set with respect to the whole container containing the articles.

It is noted that the articles contained in the container can be detected by, for example, providing a reader/writer to the container.

Also, in the case where a specific handling right is set with respect to the whole container containing the respective articles, the handling right may be changed in accordance with the position of the container.

This will be described with reference to FIG. 15 by assuming a case where the articles are clothing and the container is a laundry basket. It is herein assumed that when the laundry basket is present in the dressing room, the handling rights of the clothing put in the laundry basket are not changed (namely, the handling rights previously set with respect to the clothing are kept), and that when the laundry basket is present in a drying place, the handling rights of the clothing put in the laundry basket are changed to accord with the handling right set with respect to the laundry basket.

Figure 15:
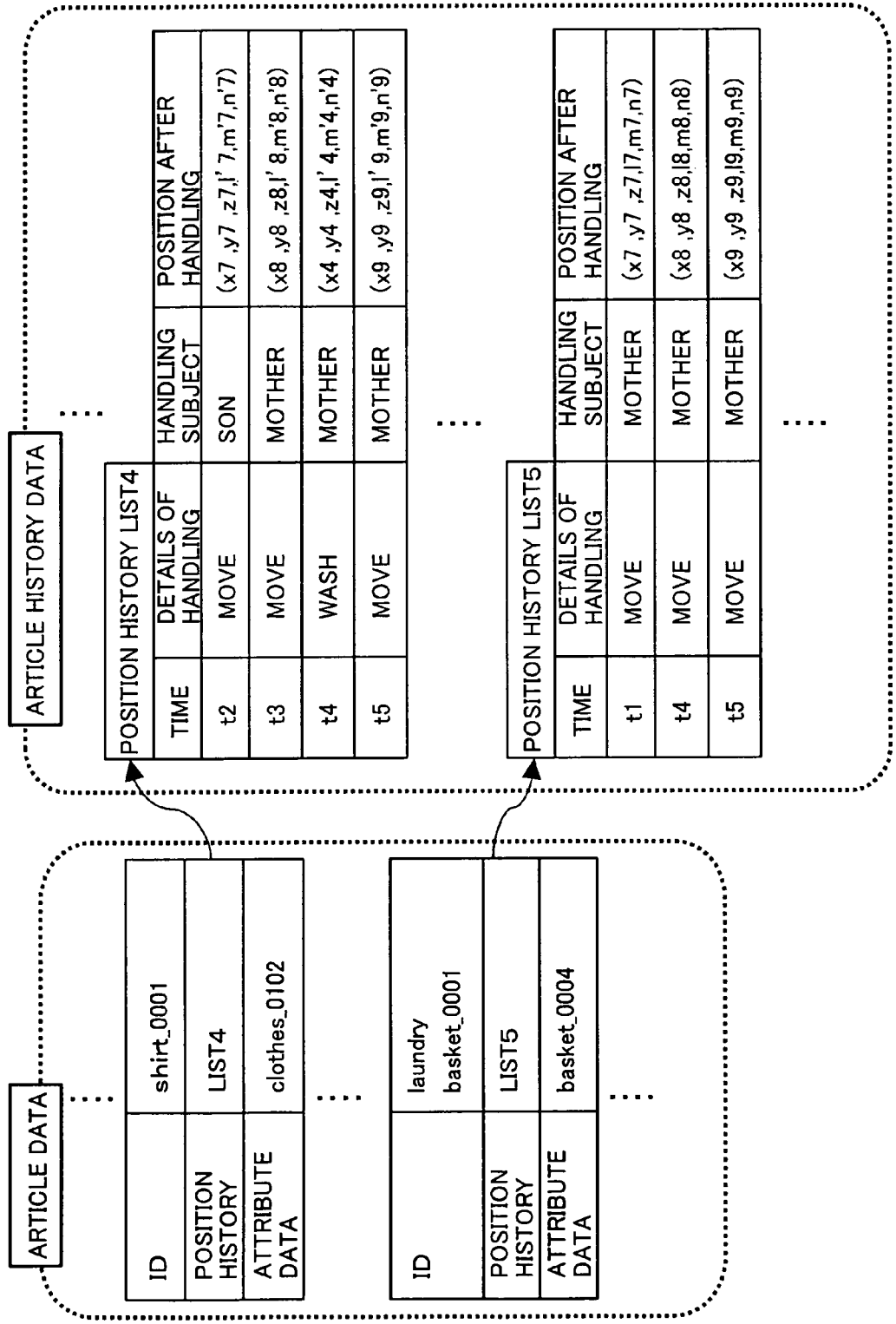
FIG. 15 is a diagram for showing exemplified contents of the article database.

FIG. 15 shows article data and article history data of a shirt and the laundry basket. In this case, an article ID "laundry basket_0001)" corresponds to the laundry basket, a position (x4, y4, z4) corresponds to the position of a washing machine, a position (x7, y7, z7) corresponds to the dressing room, a position (x8, y8, z8) corresponds to a place in the vicinity of the washing machine, and a position (x9, y9, z9) corresponds to the position of the drying place.

It is understood by referring to the article history data that Mother takes the laundry basket to the dressing room at time t1 and that Son puts the shirt (ID: shirt-0001) in the laundry basket at time t2.

As described above, when the laundry basket is present in the dressing room, the handling rights of clothing put in the laundry basket are not changed, and therefore, the handling right of the shirt is kept to be set to Son. Accordingly, Son can take the shirt out of the laundry basket.

Mother brings the laundry basket containing the shirt to the position in the vicinity of the washing machine at time t3, and the shirt is washed with the washing machine at time t4. Then, Mother puts the washed shirt in the laundry basket and moves to the drying place at time t5. At this point, as described above, the handling right of the shirt put in the laundry basket is changed to accord with the handling right of the laundry basket, and therefore, the handling right of the shirt (ID: shirt-0001)) is set to Mother alone. Accordingly, even if Son tries to take the shirt out of the laundry basket, it is restrained.

The aforementioned processing is effective also when the container is, for example, a bag.

Also, the handling right of an article contained in a container is changed in the aforementioned processing, but different processing as follows can be employed: With priority levels of respective articles previously set, when a plurality of articles are contained in a container, the handling right of other articles (including the container) are changed to accord with the handling right of an article with the highest priority level out of the plural articles. Such processing is effective in management of, for example, valuables such as jewels.

2) Processing for Changing Handling Right of Article in Accordance with Temperature Thereof An exemplified case for performing this processing is a job to serve meal or drink. Herein, a specific example that the robot 102 serves coffee in accordance with a job instruction will be described.

It is assumed in this case that the handling right of the coffee is previously set to "all". Therefore, in general, the robot 102 executes the serving job no matter which movable body issues an instruction for the coffee serving job.

However, when a person to be served is an infant, it is not preferable for safety that too hot coffee is served. Therefore, the handling right setting/changing section 125 changes the handling right of coffee in accordance with the temperature of the coffee. For example, when the temperature of the coffee exceeds a given temperature, the handling right of the coffee is set to a movable body over a given age, and when the temperature of the coffee is lower than the given temperature (including the case where the coffee has cooled), the handling right of the coffee is set to all movable bodies. As a result, the robot 102 is restrained from serving too hot coffee to an infant. It is noted that the temperature of coffee can be detected by using, for example, an infrared camera.

The processing for changing the handling right of an article in accordance with the temperature of the article is particularly effective in a kitchen or the like where equipment for control the temperature, such as a range, is frequently used.

3) Processing for Changing Handling Right of Article in Accordance with Shape Change Thereof An exemplified case for performing this processing is a case where a china is broken. In this processing, when a china is broken, its handling right is changed so that the robot can automatically take the broken china away.

In this case, when the environment sensing section 122 has the architecture using both an image sensor and an electronic tag, it can detect that the article is not in the original shape as follows:

It can be determined that an article has been broken and is not in the original shape in the case where a plurality of articles are detected by the background differential method but information read from electronic tags is smaller in the number than the number of the detected articles, or in the case where information about the size and the shape of an article is read from an electronic tag but a corresponding article cannot be detected by the background differential method.

The method for detecting break of an article is not limited to those described above but the break of an article may be detected through sound discrimination of sound detected within the environment by using, for example, a microphone.

When break of a china is detected on the basis of the detection result obtained by the environment sensing section 122, the handling right setting/changing section 125 changes the handling right of the china to "all". Then, the control section 110 of the server 101 makes the robot 102 execute a job to take the broken article away. Thus, there is no need for a human to take the broken article away. It is noted that the handling right of a broken article may be invalidated.

4) Processing for Changing Handling Right of Article in Accordance with Weight Thereof An exemplified case for performing this processing is a case where the robot supports a human to carry an article.

This processing will be described by exemplifying a case where, for example, Father enters the environment with a plurality of articles held in his arms.

As described above, when new articles are brought into the environment, the handling right setting/changing section 125 sets the handling rights of the articles to a movable body that has brought the articles. Accordingly, the handling rights of all the articles brought into the environment by Father are set to Father.

On the other hand, when the sensing means 120 reads information of electronic tags provided on the respective articles, the weight data of the respective articles are obtained, and therefore, the total weight of the articles carried by Father can be detected.

When the total weight of the plural articles is compared with a given weight $G\_th$ and is found to be larger than the given weight $G\_th$, the present system makes the robot 102 support a job of Father to carry the articles. At this point, since the handling rights of the plural articles are set to Father, the handling right setting/changing section 125 temporarily changes the handling rights to "all", so that the robot 102 can execute the carrying job.

It is noted that the threshold value $G\_th$ is previously set with respect to each movable body and registered in the database.

Another example is a case where the robot 102 automatically executes a job for discarding an article. This is effective when an article composed of a content to be consumed and a container for containing it, such as butter, is to be discarded after the content has been used up. It is noted that an electronic tag is provided on the container in such an article.

Specifically, the weight data of the container alone excluding the content is previously recorded in the database as the article attribute data. Such data can be obtained from data stored in the electronic tag. Also, it is assumed that the handling right of the article (including the container and the content) is set to any of movable bodies.

Then, the weight of the article is periodically detected by the sensing means 120. For example, the weight of the article may be detected with a weight sensor provided on the arm 12*a* of the robot 102. When it is found as a result of the detection that the weight of the article becomes equal to the weight of the container, the handling right setting/changing section 125 sets the handling right of the article to the robot 102. Then, the control section 110 of the server 101 makes the robot 102 execute the job for discarding the article.

This is particularly effective for an article whose container needs a treatment for discarding before discarding it. For example, a spray can is an article that needs a treatment for discarding a gas remaining therein by making a hole before discarding it. In an architecture for making the robot 102 automatically execute a job for discarding an article, the robot 102 can be also made to automatically execute the treatment on its container. Furthermore, also in the case where articles are separately discarded in accordance with their materials, the robot 102 can be made to automatically execute the separating job.

Also, the handling right of an article whose content has been used up may be changed to another movable body without changing it to the robot 102. For example, when there remains a content in a spray can, the spray can is an article desired to be restrained from being handled by a child. For this purpose, the handling right of a spray can is not set to a child. However, when the content has been used up and the can container is empty, it can be a toy and hence there is no need to restrain a child from handling it. Therefore, when the weight of the article is found to be equal to the weight of the container as a result of the detection by the sensing means 120 as described above, the handling right setting/changing section 125 may set the handling right of the spray can to a child.

5) Processing for Changing Handling Right of Article in Accordance with Movable Body Present in the Vicinity of Article This processing is effective for making the robot 102 execute a job to handle an article without hurting feeling of a movable body.

This processing will be described with reference to article data shown in FIG. 16. In this example, when a movable body is present in a dressing room (for example, for changing clothing), the robot 102 is restrained from executing a job in the dressing room.

The article data shown in FIG. 16 additionally includes, as compared with the article data of FIG. 13, "place of article" and "vicinity state of article". The "place of article" includes a Son's room and a dressing room, and the handling right, the tidy position and the tidy state are set with respect to each place. Also, the "vicinity state of article" includes "no person" and "some person". Specifically, when the shirt (ID: shirt-0001) is present in the Son's room, its handling right is set to Son. On the other hand, when the shirt is present in the dressing room and there is no person in the vicinity of the shirt, its handling right is set to "all", and when the shirt is present in the dressing room and there is a person in the vicinity of the shirt, its handling right is set to the person present in the vicinity.

It is assumed, for example, that when Son is changing his clothing in the dressing room, Mother present in a living room issues a job instruction to wash the shirt present in the dressing room to the robot 102. In this case, the handling right of the shirt present in the dressing room is set to a movable body present in the vicinity, namely, Son, and therefore, Mother does not have the handling right. Accordingly, the instruction having been issued to the robot 102 is not executed.

It is possible to employ an architecture in which the server 101 informs Son that Mother issues the job instruction for asking for a permission for the robot 102 executing the job.

Alternatively, the instruction issued by Mother may be stacked so that the robot 102 can execute the job related to the instruction after Son goes out of the dressing room and the handling right is changed to "all".

Furthermore, although the handling right set with respect to each article is changed in the exemplified data of FIG. 16, the handling right may be changed correspondingly to a place. Alternatively, the handling right set with respect to the attribute of an article may be changed.

Moreover, in order to inhibit the robot 102 from executing a job in the vicinity of a movable body, the handling right set to the robot 102 may be invalidated when there is any movable body in the vicinity of the article. Also, in the aforementioned example, the robot 102 may be inhibited from entering the dressing room when there is any person in the dressing room. In this case, the person present in the dressing room alone may allow the robot 102 to enter the dressing room.

6) Processing for Changing Handling Right of Article in Accordance with History Information Thereof This processing is performed for preventing inappropriate handling of an article beforehand and for making the robot 102 automatically execute an appropriate handling job. An exemplified case for performing this processing is a case of clothing, which will now be described for explaining the processing in detail.

FIGS. 17 and 18 respectively show article history data of a shirt (ID: shirt-0001) whose handling right is set to Son. In this case, a position (x3, y3, z3) corresponds to drawers, a position (x5, y5, z5) corresponds to a Son's room and a position (x6, y6, z6) corresponds to the position of a front door. It is assumed that the tidy position of the shirt is set to a position (x3, y3, z3, l3, m3, n3).

Referring to the article history data of FIG. 17, the handling history of the shirt can be found. Specifically, this clothing was washed by Mother at time t1; moved to the drawers by Mother at time t2; taken out of the house through the front door by Son at time t3; brought into the house through the front door by Son at time t4; and moved to the position (x5, y5, z5) by Son at time t5.

On the basis of this handling history, the shirt was once taken out of the house, and therefore, it is presumed that the shirt is dirty and needs to be washed.

Therefore, the handling right setting/changing section 125 changes the handling right of the shirt to "all", and the control section 110 of the server 101 issues a job instruction to the robot 102 for moving the shirt to a laundry basket. As a result, the shirt is automatically put in the laundry basket.

On the other hand, referring to the article history data of FIG. 18, the shirt was washed by Mother at time t11; moved to the drawers by Mother at time t12; and moved to the position (x5, y5, z5) by Son at time t13.

On the basis of this handling history, the shirt was not taken out of the house after being washed, and therefore, it is presumed that there is no need to wash the shirt. In this case, the handling right setting/changing section 125 does not change the handling right of the shirt.

As described above, when the shirt is left in the Son's room, the handling right may be temporarily invalidated for making the robot 102 execute a tidying job.

7) Processing for Changing Handling Right of Article in Accordance with Use-by Date Thereof This processing is also performed for preventing inappropriate handling of an article beforehand and for making the robot 102 automatically execute an appropriate handling job.

An exemplified case for performing this processing is a case where the handling right of food is changed in accordance with its freshness date. Specifically, food is preferably discarded after the freshness date so as to prevent a person from eating it. Therefore, foods whose freshness dates have passed are extracted on the basis of data of articles managed by the article DB 161, and the handling right setting/changing section 125 changes the handling rights of these foods to the robot 102 alone. Thus, when a movable body other than the robot 102 is to handle the food, a warning operation of the warning section is performed as described above. In this warning operation, it is preferably warned that, for example, the freshness date has passed. The information of the freshness date is stored in the electronic tag provided on the food. Also, several days before the freshness date, the server 101 for managing the articles may inform a movable body having the handling right that the freshness date will be passing.

The aforementioned processing is performed for changing the handling right of food after the freshness date has passed, but the handling right setting/changing section 125 may change the handling right of the food before, for example, the freshness date passes. Specifically, the handling right of the food is changed to "all", and thus, the handling right is set also to a movable body that has not have the handling right. In this manner, a probability that the food is consumed before the freshness date is increased. When the handling right of the food is changed before the freshness date passes, all movable bodies having the handling right are preferably informed of the change of the handling right.

8) Processing for Changing Handling Right of Article Under Special Conditions

In changing the place or emergency such as fire, it is preferred that the handling rights of all articles are changed at the same time. This is because, for example, in the occurrence of fire, if articles present in the environment are restrained from being handled by their handling rights, it is apprehended that fire fighting and rescue are disturbed.

Therefore, under these conditions, the handling right setting/changing section 125 sets the handling rights of all the articles managed in the database to "all". Thus, anyone can handle the articles present in the environment.

Also, movable bodies to which the handling rights are set at this point preferably include movable bodies working in the environment in emergency, such as firefighters and policemen. The firefighters and policemen can be recognized by utilizing a general method, for example, of combination of ID data and biometrics recognition.

It is noted that the occurrence of fire can be detected by detecting the temperature within the environment by using an infrared camera.

The handling rights of the articles alone are changed in the aforementioned processing, and in occurrence of, for example, an earthquake, with the handling rights of the articles changed, the robot 102 can automatically execute a job to return articles to their tidy positions and their tidy states. Specifically, when a gas fixture is opened or glass is broken by the earthquake, it is not preferred for prevention of disasters that the articles are restrained from being handled by the handling rights.

Therefore, when an earthquake occurs, the handling right setting/changing section 125 changes the handling rights of all the articles at the same time, and the control section 110 of the server 101 makes the robot 102 execute jobs to tidy all the articles. These jobs may be previously provided with priority levels, so that a job for a gas fixture that can cause secondary disaster and a job for broken glass can be priorly executed and jobs for other articles (such as clothing and books) can be executed afterward. Also, with respect to articles that are broken and cannot be returned to their tidy positions or their tidy states, the server 101 may inform movable bodies having the handling rights of the articles. Alternatively, the server 101 may automatically make contact with a repair shop for the articles or the like.

It is noted that the occurrence of an earthquake can be detected on the basis of a camera image captured within the environment. For example, periodic movement of the whole image can be detected by obtaining an inter-frame difference of captured images. The occurrence of an earthquake can be detected on the basis of this detection result. Alternatively, the occurrence of an earthquake may be detected with a seismograph.

In the above description, the processing for changing the handling rights previously set with respect to the articles on the basis of the state within the environment are mainly described. With respect to an article whose handling right is not set, the handling right can be newly set similarly in accordance with the position, the temperature, the shape change or the like of the article.

(Modification 1)

Although the system described in the aforementioned embodiment includes the moving robot 102, the article management system can be constructed as a system not including the moving robot 102.

(Modification 2)

In the system described in the aforementioned embodiment, handling of articles present in the environment is detected by using the sensing means 120, and an article handling job executed by the robot 102 is also detected by the sensing means 120. Thus, the sensing means 120 identifies the article and the article handling subject on the basis of the detection results and determines whether the article handling subject has the handling right of the article.

However, the robot 102 executes an article handling job in accordance with a job instruction, and therefore, the article handling job executed by the robot 102 can be recognized without using the sensing means 120. Therefore, the determination about the handling right can be made at the time of issuing the job instruction to the robot 102.

Specifically, since the job instruction to the robot 102 includes an article related to the job, the article is identified by the job instruction. Also, the article handling subject is identified through the recognition performed in inputting the job instruction to the robot 102.

Thus, the article/movable body retrieval/management section 105 makes determination about the handling right when the job instruction is input. When it is found, as a result of the determination, that the movable body issuing the job instruction does not have the handling right, the control section 110 does not send a robot control command to the robot 102. In other words, the details of the job of the robot 102 are set to be empty. On the other hand, merely when the movable body has the handling right, the control section 110 sends the robot control command to the robot 102. Because the control section 110 thus performs processing for determining the details of the job of the robot 102 in accordance with the determination made about the handling right, a movable body not having the handling right is restrained from handling the article by using the robot 102.

As described so far, the present article management system is a system for managing articles within a given space (environment), and includes the sensing means 122 for detecting that an article is handled by a movable body in the space; the article identifying part 32 for identifying the article handled by the movable body in response to the detection result obtained by the sensing means 122; and the article handling subject identifying part 33 for identifying the article handling subject that handles the article in response to the detection result obtained by the sensing means 122.

When an article is handled by a movable body in the environment, this is detected by the sensing means 122, and in response to the detection result, the article identifying part 32 identifies the article and the article handling subject identifying part 33 identifies the article handling subject. As a result, handling of an article by a movable body within the environment is managed.

When the system further includes the database 161 for storing the information of handling rights set with respect to the articles; and the handling right determining part 34 for determining, in response to the identification result about the article obtained by the article identifying part 32 and the identification result about the article handling subject obtained by the article handling subject identifying part 33, whether or not the article handling subject has the handling right of the article on the basis of the information stored in the database 161, management of handling of an article by a movable body by utilizing the handling right can be realized.

In the case where the system further includes the handling right setting/changing section 125 for setting the handling rights and storing them in the database, when the handling right setting/changing section 125 sets the handling right of an article to a movable body (for example, the handling right is set to "Mother" in the aforementioned example), the handling rights can be finely set. Also, when the handling right setting/changing section 125 sets the handling right of an article to a movable body group consisting of a plurality of movable bodies (for example, the handling right is set to "parents" in the aforementioned example), the handling rights can be easily set.

Furthermore, when the handling right setting/changing section 125 sets the handling right with respect to each article (for example, the handling right of the specific medicine cabinet 22 is set in the aforementioned example), the handling rights can be finely set. Also, when the handling right setting/changing section 125 sets the handling right with respect to each article group consisting of articles having the same attribute (for example, the handling right is set with respect to all articles having the attribute of the medicine cabinet in the aforementioned example), the handling rights can be easily set.

When the system further includes the warning section 124 that performs, when the article handling subject does not have the handling right of the article, a warning operation in the space where the article is handled in response to the determination result obtained by the handling right determining part 34, the article handling subject not having the handling right can be restrained from handling the article. Also, since the warning operation is performed for a movable body present in the vicinity of the article handling subject, if the article handling subject is, for example, a child, the handling can be effectively stopped.

Furthermore, when the system further includes the informing section 123 that performs, when the article handling subject does not have the handling right of the article, an informing operation for informing it in the space where the article is handled in response to the determination result obtained by the handling right determining part 34, a movable body present outside the space can recognize it. Thus, if the article handling subject is, for example, a child, a parent present outside the space can be informed of this, and as a result, the handling of the article by the child can be effectively restrained.

The sensing section 121 detects passage of an article with an article handling subject through a doorway for connecting the space with the outside, the article identifying part 32 identifies the article passing through the doorway in response to the detection result obtained by the sensing section 121, the article handling subject identifying part 33 identifies the article handling subject having allowed the passage of the article in response to the detection result obtained by the sensing section 121, and thus, egress and ingress of an article to and from the environment are managed. Also, thus, an article can be restrained from being taken out or brought into.

In the case where the system further includes the robot 102 for executing an article handling job in response to a job instruction, when an article is handled by the robot 102, the article handling subject identifying part 33 identifies, as the article handling subject that handles the article, a subject having issued the job instruction to the robot 102. Thus, a substantial article handling subject can be identified when the article is handled by using the robot 102.

In this case, when the system further includes the robot control section 110 for stopping the handling job of the robot 102 if the subject having issued the job instruction to the robot 102 does not have the handling right of the article, a movable body not having the handling right can be definitely restrained from handling the article by using the robot 102.

The handling right setting/changing section 125 sets and/or changes the handling right on the basis of the detection result obtained by the sensing means 120, so that the handling right can be optimized in accordance with the state within the environment. As a result, for example, the robot 102 automatically executes a given job, which increases convenience in human activity.

ALTERNATIVE EMBODIMENTS

In this embodiment, the article management system includes the four sub-systems of the environment management server 101, the robot 102, the operation terminal 103 and the installation 104, and information are sent/received among the sub-systems 101 through 104 via the wireless or wired network. The architecture of the article management system is not limited to this, but for example, the operation terminal 103 may be integrated with the environment management server 101.

Alternatively, the number of robot 102 is not limited to one but a plurality of robots may execute their jobs in parallel and in cooperation with one another.

INDUSTRIAL APPLICABILITY

As described above, handling of an article by a movable body in a given space can be managed according to the invention, and the invention is useful for management of articles in a space where people actively move, such as an ordinary house, an office, a hotel, a shop or a hospital.

The invention claimed is:

1. An article management system for managing articles in a given space, comprising:
    a robot for executing a handling job for an article;
        robot controlling means for making said robot execute the handling job in accordance with a job instruction;
        sensing means for detecting a state of the space;
        article identifying means for identifying, when an article is handled by a movable body, said handled article in response to a detection result obtained by said sensing means;
        article handling subject identifying means for identifying, when an article is handled by a movable body, an article handling subject that handles said article in response to the detection result obtained by said sensing means;
        a database for storing information of handling rights set with respect to the articles;
        handling right determining means for determining, on the basis of said information stored in said database, whether or not said article handling subject has a handling right of said article in response to an identification result about said article obtained by said article identifying means and an identification result about said article handling subject obtained by said article handling subject identifying means; and
        handling right setting/changing means for setting and/or changing the handling rights and storing the handling rights in said database, wherein when said movable body that handles said article is said robot, said article handling subject identifying means identifies a subject having issued the job instruction as said article handling subject that handles said article.

2. The system of claim 1,
wherein said robot controlling means stops the handling job of said robot when it is found, on the basis of a determination result obtained by said handling right determining means, that said subject having issued the job instruction does not have a handling right of said article.

3. The system of claim 1,
wherein said handling right setting/changing means sets and/or changes the handling rights on the basis of the detection result obtained by said sensing means.

4. The system of claim 3,
wherein said database stores handling history information of the articles on the basis of the detection result obtained by said sensing means, and
said handling right setting/changing means sets and/or changes the handling rights of the articles on the basis of said handling history information of the articles stored in said database.

5. The system of claim 3,
wherein said sensing means detects a position of an article present in the space, and
said handling right setting/changing means sets and/or changes a handling right of said article in accordance with the position of said article detected by said sensing means.

6. The system of claim 5,
wherein when an article is contained in a container, said handling right setting/changing means makes a handling right of said article accord with a handling right of said container.

7. The system of claim 3,
wherein said sensing means detects a temperature of an article, and
said handling right setting/changing means sets and/or changes a handling right of said article in accordance with the temperature of said article detected by said sensing means.

8. The system of claim 3,
wherein said sensing means detects shape change of an article, and
said handling right setting/changing means sets and/or changes a handling right of said article in accordance with the shape change of said article detected by said sensing means.

9. The system of claim 3,
wherein said sensing means detects a weight of an article, and
said handling right setting/changing means sets and/or changes a handling right of said article in accordance with the weight of said article detected by said sensing means.

10. The system of claim 3,
wherein said sensing means detects a position of a movable body, and
said handling right setting/changing means sets and/or changes a handling right of an article in accordance with a detection result obtained by said sensing means whether or not there is a movable body in the vicinity of said article.

11. The system of claim 3,
wherein said handling right setting/changing means sets and/or changes a handling right of an article when a given state is attained in the space.

12. The system of claim 1,
wherein said robot controlling means makes said robot automatically execute the handling job by issuing the job instruction on the basis of a state of the space and the handling rights set and/or changed by said handling right setting/changing means.

13. The system of claim 1,
wherein said handling right setting/changing means sets a handling right of an article to a movable body and/or a movable body group consisting of a plurality of movable bodies.

14. The system of claim 1,
wherein said handling right setting/changing means sets a handling right with respect to each article and/or each article group consisting of articles having the same attribute.

15. An article management server for managing articles in a given space, comprising:
a database for storing information of handling rights set with respect to the articles;
robot controlling means for making a robot execute a handling job in accordance with a job instruction;
article identifying means for identifying, when an article is handled by a movable body, said handled article in response to a detected state of the space;
article handling subject identifying means for identifying, when an article is handled by a movable body, an article handling subject that handles said article in response to said detected state;
handling right determining means for determining, on the basis of said information stored in said database, whether or not said article handling subject has a handling right of said article in response to an identification result about said article obtained by said article identifying means and an identification result about said article handling subject obtained by said article handling subject identifying means; and
handling right setting/changing means for setting and/or changing the handling rights and storing the handling rights in said database,
wherein when said movable body that handles said article is said robot, said article handling subject identifying means identifies a subject having issued the job instruction as said article handling subject that handles said article.

16. The server of claim 15,
wherein said handling right setting/changing means sets and/or changes the handling rights in accordance with a state of the space.

17. An article management method for managing articles in a given space, comprising:
a detecting step of detecting a state of the space;
an article identifying step of identifying, when an article is handled by a movable body, said handled article in response to a detection result obtained in the detecting step;
an article handling subject identifying step of identifying, when an article is handled by a movable body, an article handling subject that handles said article in response to the detection result obtained in the detecting step;
a handling right determining step of determining whether or not said article handling subject has a handling right of said article in response to an identification result obtained in the article identifying step and an identification result obtained in the article handling subject identifying step; and a handling right setting step of setting a handling right in accordance with the detected state of the space, wherein when said movable body that handles said article is a robot, a subject having issued a job instruction to said robot is identified as said article handling subject that handles said article in the article handling subject identifying step.

18. An article management method for managing articles in a given space, comprising:

a detecting step of detecting a state of the space;

an article identifying step of identifying, when an article is handled by a movable body, said handled article in response to a detection result obtained in the detecting step;

an article handling subject identifying step of identifying, when an article is handled by a movable body, an article handling subject that handles said article in response to the detection result obtained in the detecting step;

a handling right determining step of determining whether or not said article handling subject has a handling right of said article in response to an identification result obtained in the article identifying step and an identification result obtained in the article handling subject identifying step; and a handling right changing step of changing a handling right in accordance with the detected state of the space, wherein when said movable body that handles said article is a robot, a subject having issued a job instruction to said robot is identified as said article handling subject that handles said article in the article handling subject identifying step.

* * * * *

UNITED STATES PATENT AND TRADEMARK OFFICE
CERTIFICATE OF CORRECTION

| | |
|---|---|
| PATENT NO. | : 7,515,990 B2 |
| APPLICATION NO. | : 10/532157 |
| DATED | : April 7, 2009 |
| INVENTOR(S) | : Satoshi Sato et al. |

Page 1 of 1

It is certified that error appears in the above-identified patent and that said Letters Patent is hereby corrected as shown below:

On the title page, the PCT Pub. Date listed as "Feb. 12, 2004" should be -- Dec. 2, 2004 --

Signed and Sealed this

Twenty-third Day of June, 2009

JOHN DOLL
*Acting Director of the United States Patent and Trademark Office*